(12) United States Patent
Taylor et al.

(10) Patent No.: US 7,979,740 B2
(45) Date of Patent: *Jul. 12, 2011

(54) GAMING MACHINE HAVING GAME PLAY SUSPENSION AND RESUMPTION FEATURES USING BIOMETRICALLY-BASED AUTHENTICATION AND METHOD OF OPERATING SAME

(75) Inventors: Eric F. Taylor, Carson City, NV (US); Jean-Marie Gatto, London (GB); Thierry Brunet de Courssou, Missillac (FR)

(73) Assignee: Mudalla Technology, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/707,475

(22) Filed: Feb. 17, 2010

(65) Prior Publication Data

US 2010/0299556 A1    Nov. 25, 2010

Related U.S. Application Data

(60) Continuation-in-part of application No. 12/274,191, filed on Nov. 19, 2008, now Pat. No. 7,702,950, which is a continuation of application No. 10/975,153, filed on Oct. 27, 2004, now Pat. No. 7,478,266, which is a division of application No. 09/861,850, filed on May 21, 2001, now Pat. No. 7,051,332.

(51) Int. Cl.
*G06F 11/00* (2006.01)
(52) U.S. Cl. ............ 714/15; 714/20; 714/51; 463/24; 340/5.82; 382/116; 726/5; 726/28

(58) Field of Classification Search .......... 714/5, 10, 714/15, 20, 21, 23, 51, 55; 463/1, 24, 29, 463/43; 713/171, 176, 180; 340/5.82; 382/116; 726/4, 5, 17, 18, 19, 21, 26, 27, 28
See application file for complete search history.

(56) References Cited

U.S. PATENT DOCUMENTS 4,465,901 A    8/1984    Best
4,558,176 A    12/1985   Arnold et al.
(Continued)

OTHER PUBLICATIONS

Office Action dated Jul. 30, 2004 in related U.S. Appl. No. 09/861,850, now US patent 7,051,332.

(Continued)

*Primary Examiner* — Robert Beausoliel
*Assistant Examiner* — Joseph D Manoskey
(74) *Attorney, Agent, or Firm* — Young Law Firm, P.C.

(57) ABSTRACT

A gaming machine includes a processor adapted to execute a program of a game; a biometric reader configured to capture first biometric data from the player, and a trusted cache. The trusted cache includes a nonvolatile memory that is configured to store the first biometric data; a context data save engine configured to save the context of the program to the nonvolatile memory and to associate the stored first biometric data with the saved context of the program upon the processor receiving a request from the player to suspend game play, and a context data recovery engine configured to recover the saved context from the nonvolatile memory and to cause continued execution of the program from the recovered saved context upon the biometric reader capturing second biometric data from the player that matches the stored first biometric data and receiving a request from the player to resume game play.

38 Claims, 21 Drawing Sheets

U.S. PATENT DOCUMENTS

| | | | |
|---|---|---|---|
| 4,847,902 | A | 7/1989 | Hampson |
| 5,701,516 | A | 12/1997 | Cheng et al. |
| 5,905,521 | A | 5/1999 | Gatto |
| 5,944,821 | A | 8/1999 | Angelo |
| 5,960,411 | A | 9/1999 | Hartman |
| 5,982,887 | A | 11/1999 | Hirotani |
| 6,073,118 | A | 6/2000 | Gormish et al. |
| 6,105,148 | A | 8/2000 | Chung et al. |
| 6,118,860 | A | 9/2000 | Hillson |
| 6,205,550 | B1 | 3/2001 | Nardone |
| 6,233,565 | B1 | 5/2001 | Lewis |
| 6,308,256 | B1 | 10/2001 | Folmsbee |
| 6,347,307 | B1 | 2/2002 | Sandhu et al. |
| 6,389,402 | B1 | 5/2002 | Ginter et al. |
| 6,397,301 | B1 | 5/2002 | Quach et al. |
| 6,592,457 | B1* | 7/2003 | Frohm et al. .................. 463/16 |
| 2001/0018736 | A1 | 8/2001 | Hashimoto et al. |
| 2001/0046893 | A1* | 11/2001 | Giobbi et al. .................. 463/24 |
| 2001/0047489 | A1 | 11/2001 | Ito et al. |
| 2002/0010640 | A1* | 1/2002 | Dutta et al. .................. 705/26 |
| 2002/0142844 | A1* | 10/2002 | Kerr .................. 463/42 |
| 2003/0128867 | A1* | 7/2003 | Bennett .................. 382/115 |
| 2004/0199469 | A1* | 10/2004 | Barillova et al. .................. 705/44 |
| 2007/0052517 | A1* | 3/2007 | Bishop et al. .................. 340/5.2 |
| 2009/0124376 | A1* | 5/2009 | Kelly et al. .................. 463/29 |
| 2009/0157557 | A1* | 6/2009 | Hobson et al. .................. 705/67 |

OTHER PUBLICATIONS

Office Action of Jun. 22, 2005 in related U.S. Appl. No. 09/861,850, now US patent 7,051,332.

Office Action of Sep. 18, 2007 in related U.S. Appl. No. 10/975,970, now abandoned.

Office Action of Dec. 18, 2007 in related U.S. Appl. No. 10/975,970, now abandoned.

Office Action of Jan. 8, 2008 in related U.S. Appl. No. 10/975,153, now US patent 7,478,266.

Office Action of Sep. 29, 2009 in related U.S. Appl. No. 12/274,191, now US patent 7,702.950.

Schneier, Bruce, Secrets and Lies: Digital Security in a Networked World, Ch. 6, pp. 85-101, John Wiley & Sons, Inc. 2000.

Schneier, Bruce, Secrets and Lies: Digital Security in a Networked World, Ch. 7, pp. 102-119, John Wiley & Sons, Inc. 2000.

Schneier, Bruce, Secrets and Lies: Digital Security in a Networked World, Ch. 20, pp. 307-317, John Wiley & Sons, Inc. 2000.

Office Action mailed Feb. 5, 2008, in related Canadian Application No. 2,486,968, now abandoned.

SR and IPER of Jul. 2, 2004 in related PCT application PCT/US02/16939.

* cited by examiner

GAMING MACHINE HAVING GAME PLAY SUSPENSION AND RESUMPTION FEATURES USING BIOMETRICALLY-BASED AUTHENTICATION AND METHOD OF OPERATING SAME

CROSS-REFERENCE TO RELATED APPLICATIONS

This application is a continuation-in-part of patent application Ser. No. 12/274,191 filed Nov. 19, 2008 now U.S. Pat. No. 7,702,950, which is a Continuation of application Ser. No. 10/975,153 filed on Oct. 27, 2004 now U.S. Pat. No. 7,478,266, which is a divisional of patent application Ser. No. 09/861,850, filed May 21, 2001, now U.S. Pat. No. 7,051,332 which are hereby incorporated herein by reference, and from which priority is hereby claimed under 35 U.S.C. §120.

This application is related in subject matter to commonly assigned U.S. Pat. No. 7,346,917 and to application Ser. No. 09/862,036, filed May 21, 2001, both of which are hereby incorporated herein by reference.

BACKGROUND OF THE INVENTION

1. Field of the Invention

The invention generally pertains to the field of electronic commerce and the merging of technology and personal services.

2. Description of the Related Art

Electronic commerce (e-commerce) is traditionally practiced using a Web browser running on a personal computer (PC) connected to the Internet. Although online goods and services providers can offer attractive, practical, efficient and reliable e-commerce via the Internet, a typical end-to-end e-commerce transaction can take several minutes to complete.

Moreover, existing e-commerce methods can leave the consumer wondering whether the online transaction was successfully completed. At times, the consumer may not be certain that the online transaction was successfully completed until the goods actually show up at the door. A good practice is for the e-commerce provider to send an acknowledgment of the consumer's order by email, the email containing all of the details needed to allow the user to check the current status of the order. E-commerce sites such as Amazon.com have refined the process in order to provide an excellent quality of service that almost everyone has come appreciate and trust. For example, the "1-click" purchase model patented by Amazon.com considerably speeds up the purchase of items for already registered users, and the user need not wait online for a confirmation that the credit card payment was accepted. Moreover, easy account access allows the user to check the status of a pending order and the status of the delivery. Every change made either by the user or by the provider is automatically acknowledged in an email message posted to the user.

Removing the issue of bad or non-payment, such a transactional model for executing an online transaction is essentially biased in favor of the provider, in that the provider always knows whether the purchase request is valid or is invalid. In contrast, the shopper may have doubts as to the success of his or her purchase request until such time as an explicit acknowledgment is provided, which may not occur until a quite a significant time after the online order has been submitted. Typically, the acknowledgment is supplied as a displayed message, a printed receipt or an email. This is because e-commerce servers are not optimized to provide an instantaneous acknowledgment, especially when a clearing bank is involved in validating a credit card purchase.

Consequently, because of the lack of a reliable, speedy and trusted e-commerce transactional model, consumer-oriented Internet appliances optimized to carry out e-commerce are quasi-inexistent.

SUMMARY OF THE INVENTION

According to an embodiment thereof, the present invention is a gaming machine configured to enable a player to play a game. The gaming machine may include a processor adapted to execute a program of the game; a biometric reader coupled to the processor, the biometric reader being configured to capture first biometric data from the player, and a trusted cache, the trusted cache being coupled to the processor. The trusted cache may include a nonvolatile memory, the nonvolatile memory being configured to store the first biometric data, a context data save engine and a context data recovery engine. The context data save engine may be configured to save the context of the program to the nonvolatile memory and to associate the stored first biometric data with the saved context of the program, upon the processor receiving a request from the player to suspend game play. The context data recovery engine may be configured to recover the saved context from the nonvolatile memory and to cause continued execution of the program from the recovered saved context upon the biometric reader capturing second biometric data from the player that matches the stored first biometric data and receiving a request from the player to resume game play.

According to further embodiments, the trusted cache may further include a watchdog timer, the watchdog timer being configured to timeout and generate an alert signal unless periodically reset. The gaming machine may further include a restart engine that may be configured to initiate a controller restart cycle upon receiving the alert signal. The restart engine may be configured to initiate a three phase controller restart cycle comprising a software reboot cycle, a hardware reset cycle and a power off cycle, the hardware reset cycle only being initiated upon failure of the software reboot cycle and the power off cycle only being initiated upon failure of the hardware reset cycle. The first and second biometric data may include one or more of fingerprint data, iris scan data, retina scan data, voice print data, facial feature data, hand geometry data and/or signature data. The first and second biometric data may include data associated with a measurable anatomical characteristic of the player. Alternatively or in addition, the first and second biometric data may include data associated with a measurable physiological characteristic of the player. Alternatively or in addition, the first and second biometric data may include data associated with a measurable behavioral characteristic of the player.

According to embodiments of the present invention, the context data recovery engine is configured to enable resumption of the program as of a state thereof at which the player requested suspension of game play. The processor may be further configured to cause meters of the player to be stored upon receipt of the request from the player to suspend game play. The gaming machine may further include a network interface, the network interface being configured to couple the gaming machine to a network. The processor may be further configured to send the player's meters over the network interface to be stored in a central server coupled to the network. According to embodiments of the present inventions, the context data recovery engine is configured to cause the player's meters to be requested and received from the central server and to cause continued execution of the program from the recovered saved context and the received player's meters. The nonvolatile memory may be further configured to store meters of the player and the context data recovery engine may be configured to cause the player's meters to be retrieved from the non-volatile memory and to cause continued execution of the program from the recovered saved context and the retrieved player's meters.

Another embodiment of the present inventions is a gaming machine configured to enable a player to play a game. The gaming machine may include a processor adapted to execute a program of the game; a network interface, the network interface being configured to couple the gaming machine to a network; a biometric reader coupled to the processor, the biometric reader being configured to capture first biometric data from the player and to cause the captured first biometric data to be sent over the network interface to a central server coupled to the network; a context data save engine configured to save a context of the program and to send the player's meters and the saved context over the network interface to the central server and to associate the first biometric data with the saved context of the program, upon the processor receiving a request from the player to suspend game play, and a context data recovery engine adapted to cause the first biometric data, the player's meters and the saved context to be requested and received from the central server over the network interface and to cause continued execution of the program from the received saved context using the received player's meters upon the biometric reader capturing second biometric data from the player that matches the received first biometric data and the processor receiving a request from the player to resume game play.

The gaming machine may further include a watchdog timer, the watchdog timer being configured to timeout and generate an alert signal unless periodically reset. The gaming machine may also include a restart engine configured to initiate a controller restart cycle upon receiving the alert signal. The restart engine may be configured to initiate a three phase controller restart cycle comprising a software reboot cycle, a hardware reset cycle and a power off cycle, the hardware reset cycle only being initiated upon failure of the software reboot cycle and the power off cycle only being initiated upon failure of the hardware reset cycle.

The first and second biometric data may include one or more of fingerprint data, iris scan data, retina scan data, voice print data, facial feature data, hand geometry data and/or signature data, for example. The first and second biometric data may include data associated with a measurable anatomical characteristic of the player and/or with a measurable physiological characteristic of the player and/or with a measurable behavioral characteristic of the player. The context data recovery engine may be configured to enable resumption of the program as of a state thereof at which the player requested suspension of game play.

According to yet another embodiment thereof, the present invention is a method of securely executing a software program of a regulated gaming machine. The method may include steps of retrieving a timeout value and a first biometric data from an entry in a table; setting a counter to the timeout value and starting the counter; capturing second biometric data from a player of the gaming machine; determining whether the first biometric data retrieved from the table matches the second biometric data captured from the player of the gaming machine, and terminating an execution of the software program if the counter indicates that the timeout value has been exceeded or if the first biometric data retrieved from the table does not match the second biometric data captured from the player of the gaming machine.

The method may also include the step of returning to the retrieving step to retrieve a timeout value from the table. The method may also include the step of allowing the software program to continue execution if the first biometric data matches the second biometric data and the timeout value has not been exceeded. The first biometric data and the second biometric data may be encrypted and the determining step may include a step of decrypting the first biometric data retrieved from the table and the second biometric data captured from the player of the gaming machine. The software program may be divided into a plurality of execution sequences, each of the execution sequences being divided by a checkpoint at which the second biometric data is captured and wherein execution of each execution sequence is contingent upon a timely provision of the second biometric data at the preceding checkpoint.

Still another embodiment of the present invention is a method of carrying out an online transaction between a device and a remote server over a network. The method may include steps of capturing first biometric data from the user of the device; storing the captured biometric data in a memory of the device; initiating a user transaction at the user device; storing a copy of the user transaction in the memory of the device; sending the user transaction to the remote server under a control of the device, and generating a provisional acknowledgment of the user transaction from the copy of the user transaction stored in the memory; capturing second biometric data from the user; retrieving the first biometric data from the memory of the device and determining whether the second biometric data matches the retrieved first biometric data, and requesting a confirmed acknowledgment of the user transaction from the remote server if the second biometric data matches the first biometric data.

The method may further include receiving the confirmed acknowledgment from the remote server and storing the received confirmed acknowledgment in the memory of the device. A step may be carried out of providing the stored confirmed acknowledgment upon request from the user of the device. A step of re-sending the copy of the user transaction stored in the memory of the device to the remote server may be carried out upon failure to receive the confirmed acknowledgment from the remote server. The method may also include repeatedly (or for a predetermined number of times) carrying out the re-sending step until a confirmed acknowledgment of the user transaction is received from the remote server. The generating step may include a step of printing the provisional acknowledgment together with a corresponding machine-readable indicia that uniquely identifies the user transaction. The generating step may include a step of printing the provisional acknowledgment together with machine-readable indicia uniquely identifying the user transaction. The method may further include a step of reading the machine-readable indicia and providing the stored confirmed acknowledgment that corresponds to the read machine-readable indicia. The stored confirmation acknowledgment providing step may include a step of printing the confirmation acknowledgment.

DESCRIPTION OF THE PREFERRED EMBODIMENTS

Figure 1:
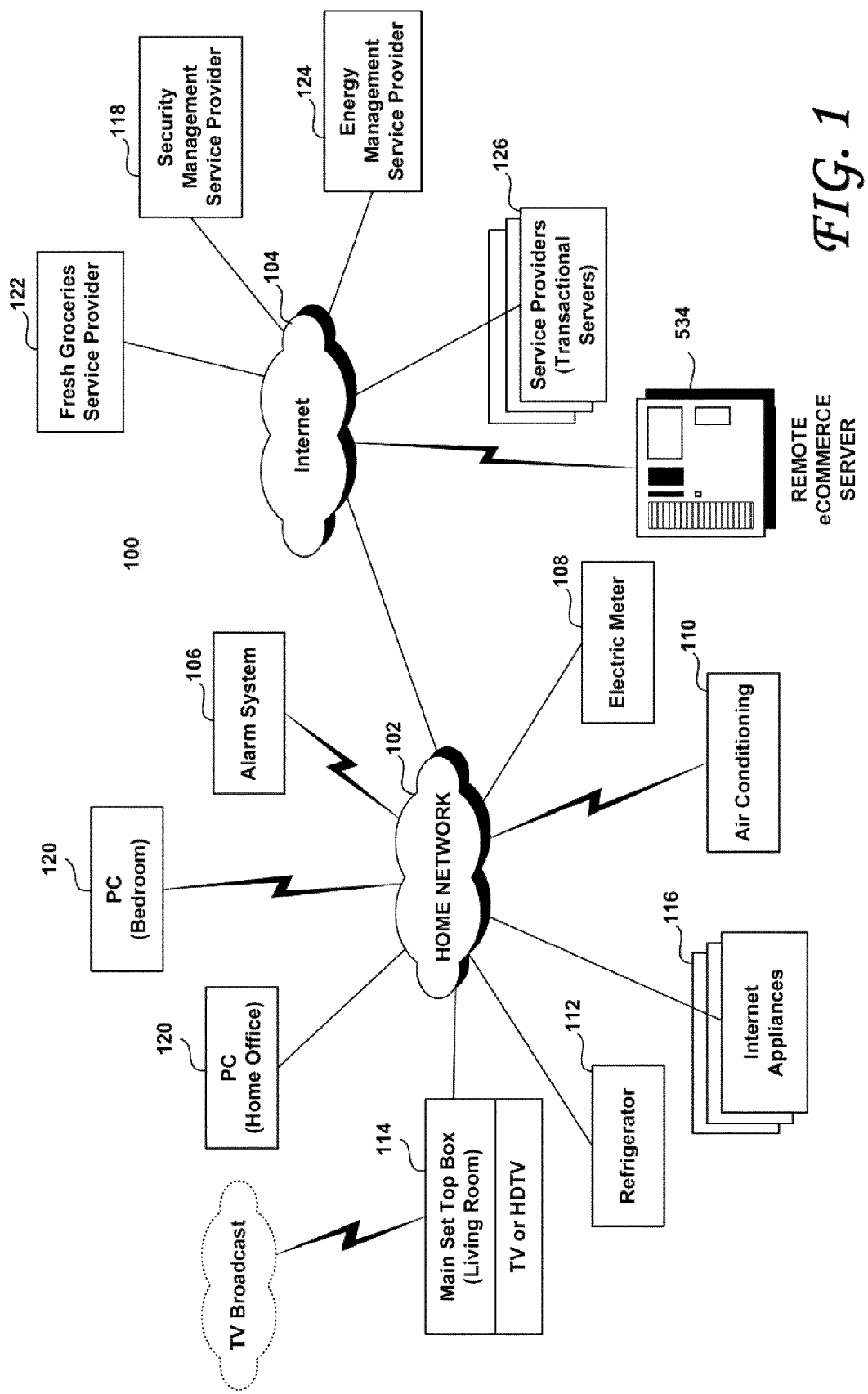
FIG. 1 is a diagram of a connected universe suitable for a Trusted Transaction Controller (TTC) according to an embodiment of the present invention.

FIG. 1 is a diagram of a universe 100 of interconnected devices suitable for a Trusted Transaction Controller (TTC) according to an embodiment of the present invention. A TTC, according to the present invention may be a device or may be incorporated within a device that operates within a universe 100 of interconnected devices such as a home network 102 and/or the Internet 104, a factory network, a small business network or a large enterprise network, for example. In a home network 102, for example, a TTC according to the present invention may be found integrated in an alarm system 106, a meter, such as a gas meter or an electricity meter 108, an air-conditioning system 110, a refrigerator 112, a television set-top box 114, a lighting management system (controlling the lights for mood, occupancy, etc.), a window management system (providing motorized shutters and curtains, motorized air vents, etc.), within kitchen (may be Internet-connected) appliances 116 such as a microwave oven, coffee maker, toaster and the like, within a security system 106, and/or a grounds watering system, to name a few applications. Alternatively still, the TTC may be, include or may be incorporated within a game console suitable for enabling a player to play games at home or a regulated gaming machine, suitable for casinos, cruise ships or like environments.

In addition, the TTC according to the present invention may coexist in a home network 102 that includes personal computers 120 having Internet access to a variety of service providers such as online grocers 122, security service providers 118, energy management service providers 124 and/or other service providers, collectively referenced by numeral 126.

Figure 2:
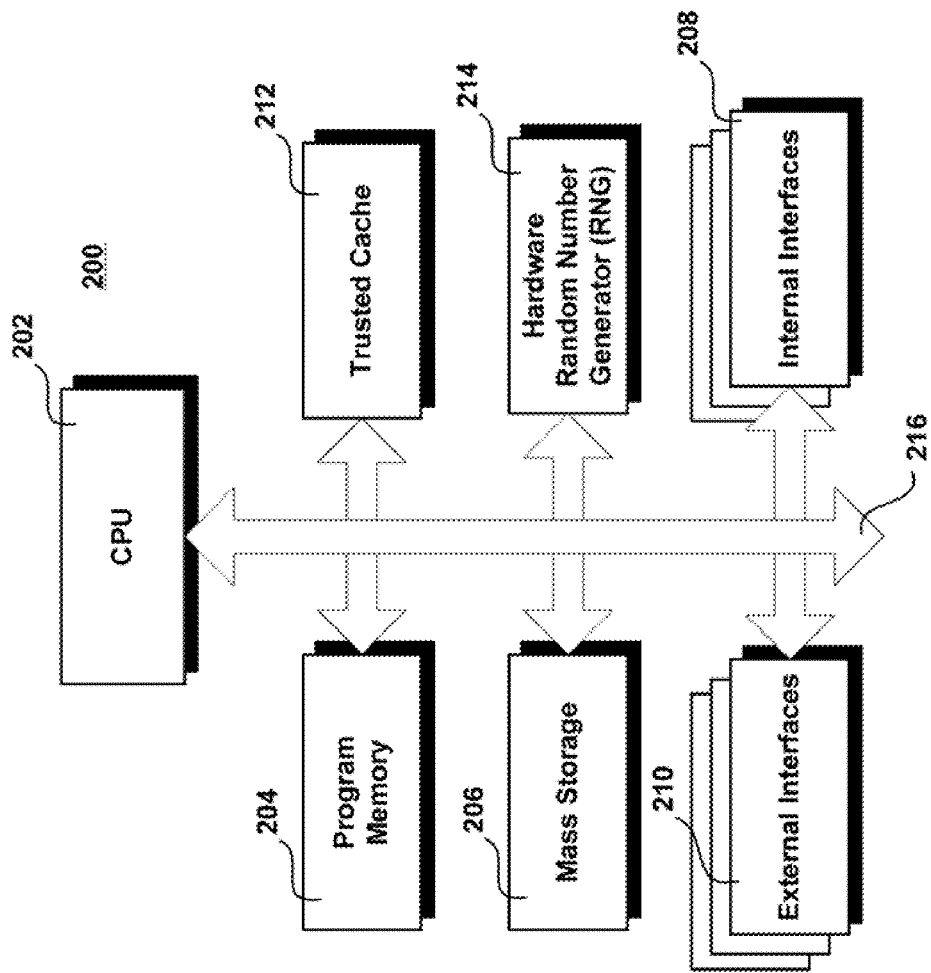
FIG. 2 is a diagram of a device employing a TTC, according to the present invention.

FIG. 2 is a block diagram of a TTC, according to an embodiment of the present invention. As shown, the TTC 200 may include a CPU 202, memory 204 (such as Static Random Access Memory—SRAM or Dynamic Random Access Memory—DRAM, for example) to execute a program and to store working data, mass storage 206 such as hard disk or flash memory for example, internal interfaces 208 such as graphics controller and communication controllers for example, external interfaces 210 such as a display monitor, mouse, keyboard for example, a trusted cache 212 to automatically recover from a temporary failure and a hardware Random Number Generator (RNG) 214 for generating true random numbers for maximum entropy encryption keys. Each of the elements 202, 204, 206, 208, 210, 212 and 214 are advantageously coupled to one another via a common bus structure, as shown at reference 216.

Figure 3:
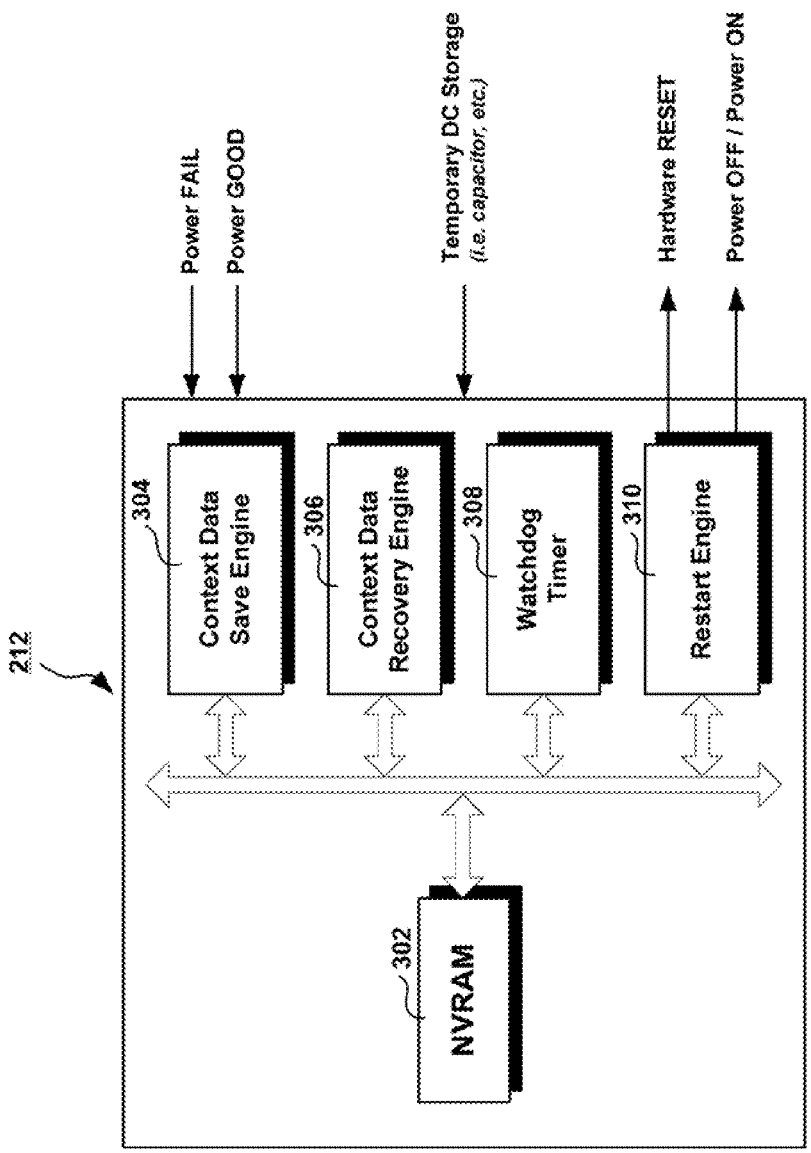
FIG. 3 is a diagram of a trusted cache, according to an embodiment of the present invention.

FIG. 3 is a diagram of a trusted cache 212, according to an embodiment of the present invention. As shown, the trusted cache 212 of the present invention may include a Non-Volatile Random Access Memory (NVRAM) 302 such as a "battery backed up" static memory or "Flash backed up" static memory (for example). Suitable memories for the NVRAM 302 are available from Simtek Corporation (www.simtek.com). The trusted cache 212 may also include a Context Data Save Engine 304 that is adapted to save the state and context of the current transaction being executed from the program memory 204 (Dynamic or Static RAM) into the NVRAM 302 as soon as power failure is sensed. A Context Data Recovery Engine 306 restores the transaction execution context from NVRAM 302 back into the DRAM or SRAM 204 as soon as the power supply is properly restored. A watchdog timer 308 may also be included in the trusted cache 212, the watchdog timer 308 being regularly reset as long as the executing software runs properly. If a time-out occurs, however, the watchdog timer 308 will alert the restart engine 310. The restart engine 310, according to an embodiment of the present invention, may then enter a recovery cycle (such as a three-stage recovery cycle, for example) as soon as an alert is received from the watchdog timer 308. The restart engine 310 may be configured to store state information of timing operations and to drive a power ON signal even when the main power is cut or removed, using electrical energy supplied by a temporary DC storage device such as a capacitor or a small battery. The invention is particularly well adapted to offer automatic recovery after temporary failure of the device containing the TTC of the present invention. Indeed, when the watchdog timer 308 is not timely reset by a normally executing program, the restart engine 310 may enter a predetermined recovery cycle, such as the 3-stage system recovery cycle illustrated in FIG. 4.

Figure 4:
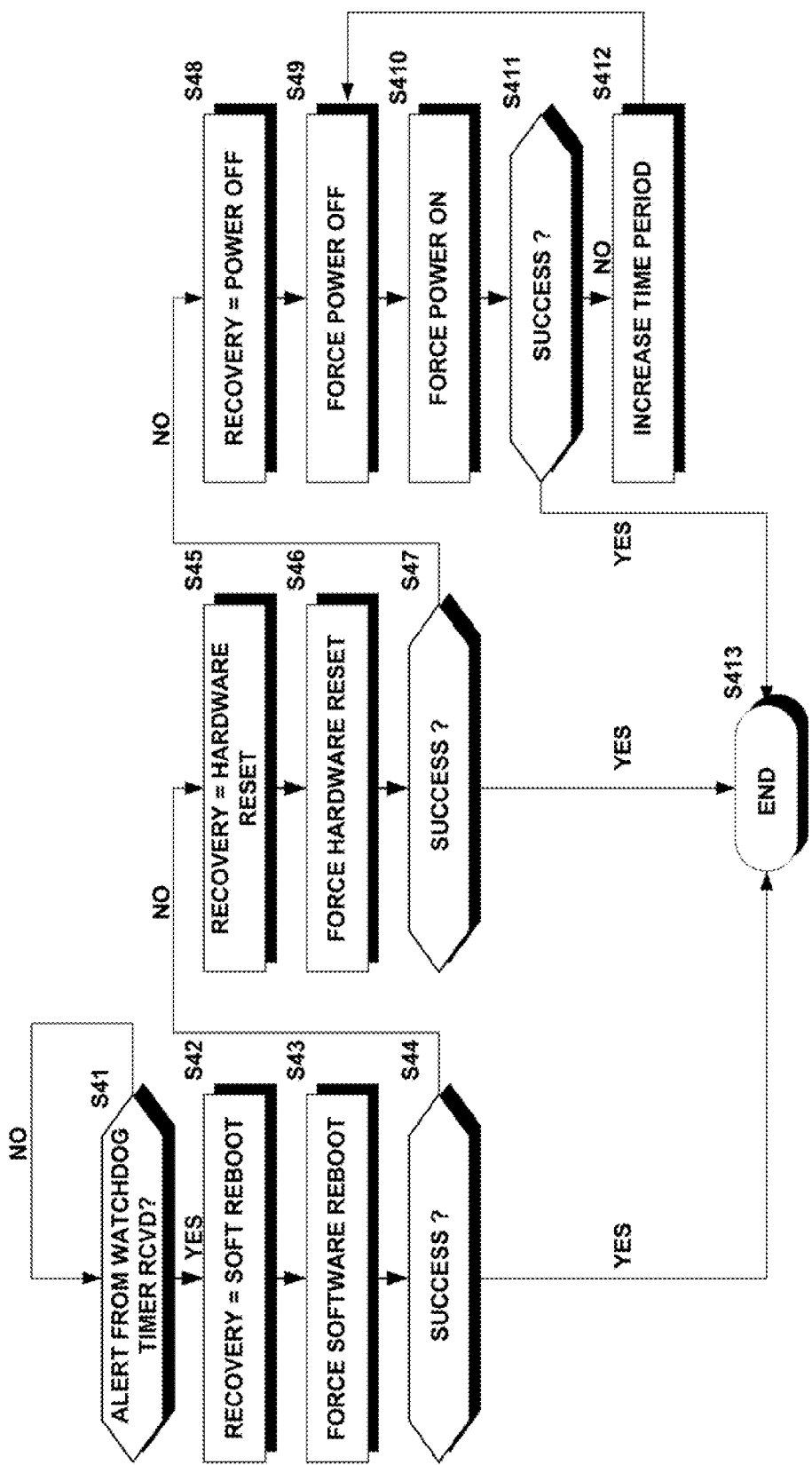
FIG. 4 is a flow chart of an operation of a restart engine, according to an embodiment of the present invention.

FIG. 4 is a flow chart of an exemplary operation of a restart engine (such as shown at 310 in FIG. 3), according to an embodiment of the present invention. According to the present invention, trusted hardware (that is, hardware that includes a TTC according to the present invention) may feature a 3-stage recovery cycle, whereby following a failure to reset the watchdog timer 308, the recovery engine 310 may automatically make up to 3 attempts (for example) to recover from the failure. As shown at S41 in FIG. 4, when the restart engine 310 receives an alert from the watchdog timer 308, the restart engine 310 may first initiate step S42, which sets the first recovery attempt at "Soft Reboot" and calls for a soft reboot of the system (such as shown at 200 in FIG. 2), which may be thought of as the equivalent of pressing the "Ctrl-Alt-Del" keys on a personal computer, for example. The soft reboot is executed at step S43. If it determined in step S44 that step S43 succeeded in restoring the system 200, the recovery process ends at S413. If the soft reboot is determined in step S44 to have been unsuccessful, step S45 may be carried out, whereby the second recovery attempt is set at "Hardware Reset" in step S45, which may be thought of as the equivalent of pressing the "Reset" button on a personal computer, for example. The system hardware is then hard reset at S46. If it is determined that the hardware reset was successful in step S47, the recovery process ends at S413. Otherwise, a third recovery attempt is carried out. Indeed, upon failing to recover from either a soft reboot or a hardware reboot, the third recovery attempt may be set at "Power Off" in step S48 and the power to the system 200 is turned off at S49 and turned on again at step S410 after a predetermined time period (such as a few seconds, for example). This may be thought of as the equivalent of turning a personal computer of for a few seconds and then turning it back on again, for example. When in the power-OFF state following step S49, the recovery engine 310 will force the power ON signal at S410 after a predetermined time period. When a recovery from power-OFF is determined to have been unsuccessful at S411, the recovery engine 310 may automatically increase the time period between power down at S49 and power up at S410, as shown at S412. This is a valuable recovery technique, as the underlying cause of the failure may be attributable to overheating. A successful recovery may occur after the equipment has had a chance to cool off. Counter and/or failure logs may keep track of the success and/or failure of each recovery attempt and may be accessible by the application software running on the system 200. Such information may be extremely valuable to the organization in charge of maintenance of the device incorporating the system 200 in assisting them in their determination of the cause of abnormal repeated recovery cycles. Recovery is also successful following an accidental power off during the execution of a transaction. FIG. 4 is but an illustrative example of a recovery process and modifications may be made to the above described methodology, as those of skill may recognize, and all such modifications are deemed to fall within the scope of the present invention. The auto-recovery feature shown in FIG. 4 is believed to be advantageous, as the tendency to use non-proven but nevertheless mission critical software on Point Of Sale (POS) terminals and Internet appliances (to name a few representative examples) is growing, as the new generation of software developers favor Internet environments and techniques such as Java over typically feature-poor embedded software. Using the recovery methodology shown in FIG. 4 or variants thereof, POS terminals or Internet appliances may automatically resume normal operation following a failure, and do so without any user awareness or intervention.

Figure 5:
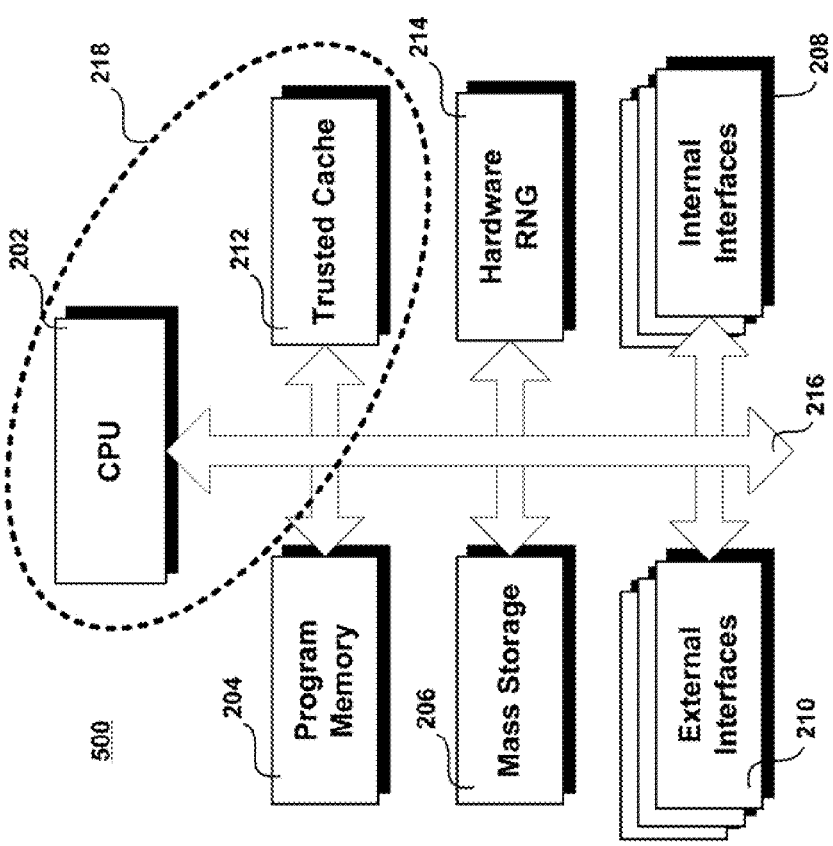
FIG. 5 is a diagram of a TTC for a Transaction Service Provider (TSP), according to an embodiment of the present invention.

FIG. 5 is a diagram of a TTC 500 for a Transaction Service Provider (TSP), according to an embodiment of the present invention. The no-battery NVRAM technology developed by Simtek Corporation is the result of combining Flash technology with standard SRAM technology on the same silicon process. Moreover, microprocessors with integrated flash memory are becoming widely available. Therefore, the trusted cache 212 may advantageously and easily be integrated together with the CPU 202 on the same silicon using a similar process, as shown at 218.

Figure 6:
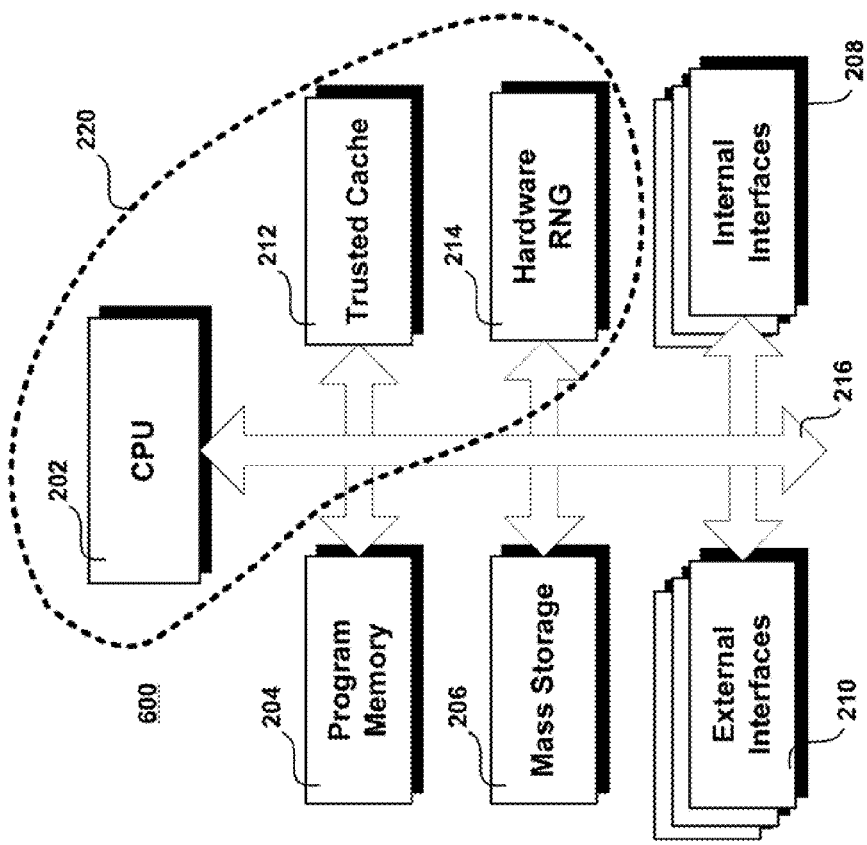
FIG. 6 is a diagram of a TTC for a TSP, according to a further embodiment of the present invention.

FIG. 6 is a diagram of a TTC 600 for a TSP, according to a further embodiment of the present invention. The hardware random number generator (RNG) technology developed by Intel Corporation (http://developerintel.com/design/security/rng/rng.htm) is embedded within a Flash memory on the same silicon process. The thermal noise from a resistor (Johnson Noise) may be used to generate a true random, non-deterministic stream of bits. Therefore, a hardware RNG 214 may be advantageously and easily integrated together with the CPU 202 and the trusted cache 212 on the same silicon using similar process, as shown by the dashed lines referenced at 220.

Trusted Cache

As discussed hereunder, the trusted cache 212 may be used to continually store the critical states of a transaction session (such as an e-commerce transaction session, for example) into non-volatile memory. Moreover, the trusted cache 212 may advantageously feature means for automatic recovery of transaction execution following a temporary failure; that is, a software crash, a hardware latch-up or an accidental power-off, for example.

Preferably, the critical states are written to the trusted cache 212 without delay and very frequently, and are retained in case of temporary failure of the TTC, either due to power outage, software crash, hardware latch-up or simply accidental user initiated power down. Saving such critical states on media such as a magnetic hard disk is believed to be too slow and too unreliable. Likewise, saving the critical states on Flash Memory is also believed to be too slow, and the writing life may be too limited (such as on the order of 100,000 to 1 million cycles, for example).

The cache technology for the trusted cache 212, therefore, is preferably chosen from either non-volatile SRAM or magnetic core memory, for example. Battery or capacitor backed-up SRAM may be included in the trusted cache 212, but the battery life and reliability may become problematic, and capacitor retention may be unduly limited (to a period of only a few days, for example).

A technology that is well suited for the trusted cache 212 is the NVRAM technology developed by Simtek, Inc. (www.simtek.com). NVRAM caches are typically used for mission critical systems such as spacecrafts, missiles, defense systems and also in lottery terminals, for example. Using such NVRAM technology, the entire content of the program memory 204 (DRAM or SRAM) is automatically copied into in Flash memory at once, as soon as a catastrophic failure is detected. Moreover, no external electrical source is required to retain the data stored in the NVRAM 302 (FIG. 3) and data retention is guaranteed for at least 10 years. When power is re-applied, the content of the Flash memory may be automatically rewritten into the program memory 204 SRAM or DRAM and ready for access. The critical states saved to the NVRAM 302 may be encrypted to prevent tampering during the transaction recovery process.

Trusted Watchdog

Figure 7:
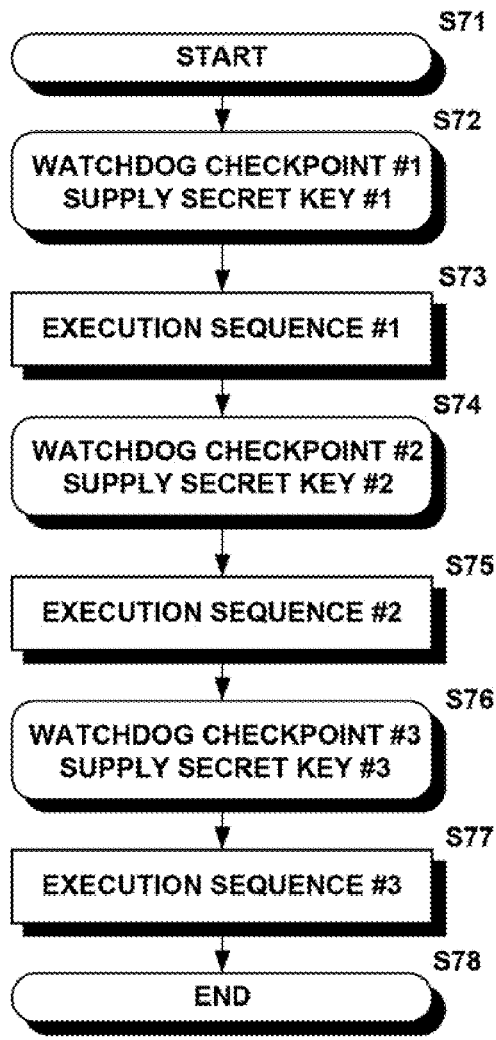
FIG. 7 is a flowchart of an execution of a trusted software for controlling a transaction, according to an embodiment of the present invention.

The watchdog 308 integrated within the trusted cache 212 is adapted to access encrypted data stored in the NVRAM 302, to decrypt the stored and encrypted data and to compare the decrypted data with a predetermined value supplied by a given program. If the supplied value does not match the decrypted data retrieved from the NVRAM 302, the watchdog 308 may activate a Power-Down cycle and/or may take some other predetermined action to maintain or restore security. Such a mechanism may form the basis for implementing a trusted watchdog 308 to prevent un-authorized or rogue software from executing. The trusted software for controlling the transactions to be carried out should preferably access the trusted watchdog 308 at predetermined checkpoints, as shown in FIG. 7.

As shown therein, any trusted (secure) software for enabling and controlling secure (e-commerce, for example) transactions, according to an embodiment of the present invention, may begin execution at S71. At a predetermined number of watchdog checkpoints within its execution cycle (three such watchdog checkpoints being shown in the illustrative example of FIG. 7), the trusted software must supply a secret key to the watchdog 308 and must supply this secret key within a selectable and/or predetermined period of time. As shown at S72, the trusted software is called upon to supply a first secret key to the watchdog 308, at a first predetermined point in its execution cycle. The watchdog 308 receives this first secret key and retrieves a corresponding first encrypted secret key from the NVRAM 302 of the trusted cache 212. The watchdog 308 then decrypts the encrypted key retrieved from the NVRAM 302 and compares it with the first secret key received from the trusted software. If the first secret key received from the trusted software matches the decrypted first key retrieved from the NVRAM 302, the trusted software is allowed to execute a first execution sequence, as shown at S73. As shown at S74, the trusted software may then be called upon to supply a second secret key to the watchdog 308, at a second predetermined point in its execution cycle. The watchdog 308 receives this second secret key and retrieves a corresponding second encrypted secret key from the NVRAM 302 of the trusted cache 212. The watchdog 308 then decrypts the second encrypted key retrieved from the NVRAM 302 and compares it with the second secret key received from the trusted software. If the second secret key received from the trusted software matches the decrypted second key retrieved from the NVRAM 302, the trusted software is allowed to execute a second execution sequence, as shown at S75. Likewise, as shown at S76, the trusted software may be called upon to supply a third secret key to the watchdog 308, at a third predetermined point in its execution cycle. The watchdog 308 receives this third secret key and retrieves a corresponding third encrypted secret key from the NVRAM 302 of the trusted cache 212. The watchdog 308 then decrypts the encrypted key retrieved from the NVRAM 302 and compares it with the third secret key received from the trusted software. If the third secret key received from the trusted software matches the decrypted third key retrieved from the NVRAM 302, the trusted software is allowed to execute a third execution (and possibly final) sequence, as shown at S77, whereupon the trusted software may allow the transaction to complete and end, as shown at S78.

Figure 8:
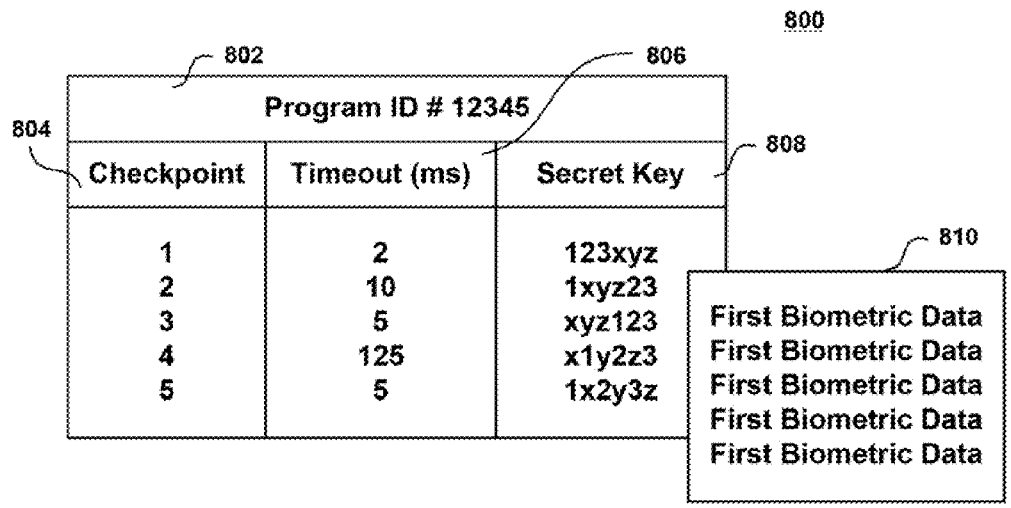
FIG. 8 is a graphical representation of a check table according to an embodiment of the present invention.
Figure 9:
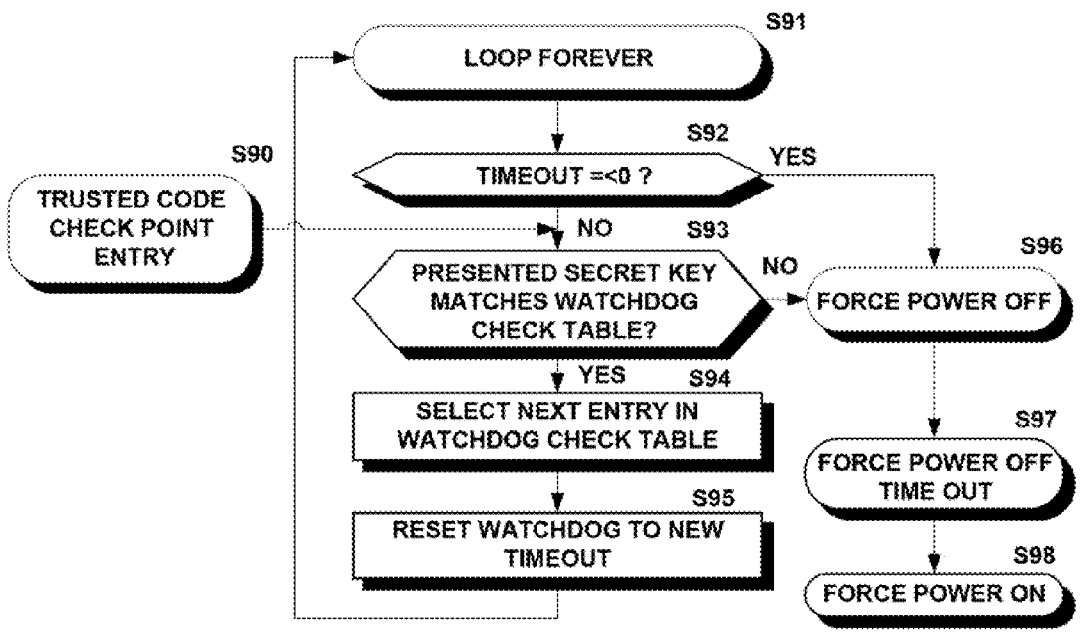
FIG. 9 is a flowchart of an exemplary operation of the watchdog according to an embodiment of the present invention.

FIG. 8 is a graphical representation of a check table 800 according to an embodiment of the present invention. The check table 800 is preferably encrypted and may be advantageously stored in the NVRAM 302 of the trusted cache 212. Preferably, the check table 800 is loaded into the NVRAM 302 in a secure manner (by a high security software utility, for example) before the execution of the trusted software controlling the transaction. The check table 800 may be unique to the trusted software controlling the transaction, and may identify the trusted software by a program ID 802. In the illustrative example of FIG. 8, the program ID is 12345. The check table 800, according to an embodiment of the present invention, includes a list of checkpoints 804 (5 such checkpoints being shown in FIG. 8), a corresponding number of timeout values (in milliseconds in the example of FIG. 8) and a corresponding number of secret keys, which may be encrypted. FIG. 9 is a flowchart of an exemplary operation of the watchdog 308, according to an embodiment of the present invention. Considering now FIGS. 8 and 9 collectively, the watchdog 308 continually monitors the operation of the trusted software controlling the execution of the transaction by looping at least through the steps S91-S95. As shown at step S90, the trusted software supplies a secret key. At step S92, as long as the watchdog timeout value is greater than zero, a watchdog alert (see FIG. 4) is not generated and the secret key presented by the trusted software is compared to the corresponding decrypted secret key 808 obtained from the check table 800 whose program ID matches the program ID of the executing trusted software. As shown at S93, if the secret key presented by the trusted software at step S90 matches the corresponding decrypted secret key 808 obtained from the watchdog table 800, the trusted software is allowed to continue its execution and the next entry (timeout value and corresponding secret key) is selected from the check table 800. The watchdog 308 is then reset to the timeout value of the selected entry in the check table 800, as shown at S95. The method then reverts to step S91. Thereafter, as long as the trusted software controlling the transaction supplies the next secret key(s) 808 before the timeout period obtained from the check table 800 elapses, the trusted software will be permitted to continue execution. However, as indicated at S92, if the appropriate secret key is not supplied by the trusted software before the expiry of the watchdog timeout value 806, a power down of the device incorporating the present invention may be forced, as indicated at S96. Alternatively or in addition to the initiation of the power down cycle, some other measure(s) may be taken to insure or maintain security of the device and/or the transaction in progress. The power may be withheld from the device incorporating the present invention for a predetermined and/or selectable period of time, as indicated at S97. At S98, the power may be restored after the power off timeout has expired, and the device incorporating the present invention may be reset, rebooted or otherwise re-initialized. Subsequent to a restart cycle, according to an embodiment of the present invention, the CPU 202 may reboot and force an extensive integrity check in order to locate corrupted data and/or virus-infected data and to initiate any necessary corrective action(s).

Hardware Random Number Generator (RNG)

A hardware RNG such as shown at 916 in FIG. 9 is extremely desirable in order to ensure maximum entropy of encryption of the secret keys such that the encrypted keys are formed of true random bits, thereby rendering a brute force attack thereon to its maximum theoretical level of difficulty.

An embedded true RNG based on diode noise, for example, enables systematic use of the highest encryption strength for the encryption algorithms and key length allowed by government. Flaws in RNGs and badly chosen encryption keys are responsible for highly publicized cracked systems such as Netscape Navigator 1.1, European GSM phones, Russian systems, etc. Although 128-bit encryption such as RSA, 3DES, etc. requires a considerable theoretical computer power to crack, a badly chosen encryption key may result in the secret keys being cracked within hours.

Because of all the sensitive and personal data that home users may have on their PCs and other devices connected to the Internet 104 and/or to other networks via the home network (for example), there is a need to provide the TTC with almost "Military Defense class" security. Virtual private Networks (VPNs), Secure Socket layer (SSL) and other secure communication protocols that rely on locally generated encryption keys are solutions that are widely available today. The resilience of such encryption protocols to attack depend on the quality of the encryption keys or their maximum entropy, such as discussed in Schneider, Secrets and Lies: Digital Security in a Networked World, Wiley & Sons, Inc. © 2000, pages 102-106, which is incorporated herein by reference.

Trusted E-Commerce Transactions

It is generally recognized that the reliability of embedded computing hardware such as Internet Appliances is far greater than the reliability of Internet and of wireless networks. The Internet 104 is a very cost effective medium for viewing rich information and for performing purchases in a secure manner, using smart cards and encryption techniques, for example. However, the availability of the Internet 104 is often unpredictable. Furthermore, an e-commerce transaction may take minutes to complete and any failure between the Internet 104 Appliance and the remote e-commerce server 534 may leave the transaction in an unknown state and the user frustrated or mislead.

The present invention, therefore, offers methods, systems and transaction models for conducting trusted lightweight e-commerce transactions via a TTC according to the present invention, whereby the e-commerce transaction is performed in seconds or even fractions of seconds. Moreover, the user of the present invention need not be concerned by the possible failure of the transaction commit to the remote server 534. Moreover, deployment of very large numbers of such TTCs according to the present invention (such as 10 million units), will not slow the connected e-commerce remote server 534 or servers 534 to a crawl when all the TTCs are committing transactions simultaneously because of a particular event. The remote servers 534 may be configured to accept the lightweight transactional model and easily handle on the order of 1,000,000 transactions per second. A suitable remote server is described in commonly assigned U.S. application Ser. No. 09/565,579 filed on May 4, 2000 and entitled "Fast Web Interface Server, Network Architectures and Systems Using Same", the disclosure of which is incorporated herewith in its entirety.

The lightweight e-commerce transactions described herein are an effective and low cost way to provide ultra fast and secure micro-payment or e-microcommerce (wherein the terms refers to low valued and/or frequent transactions—although the applicability of present invention is not limited to such micro-transactions) solutions for a multitude of competitive providers (with whom the user need not necessary have an open account). Such e-microcommerce transactions may include transactions related to on-demand music listening or delivery, on-demand HDTV music video clips or concerts, charm videos, magazine articles, betting, casino gambling, and voting, to name only a few representative candidates for such a micro-payment model.

"Provisional" and "Confirmed" Receipts

The transactional model proposed herein for conducting trusted lightweight e-commerce transactions via the TTC of the present invention is applicable to transactions such as occur in large lotteries, whereby the TTC is the transaction "master".

Figure 10:
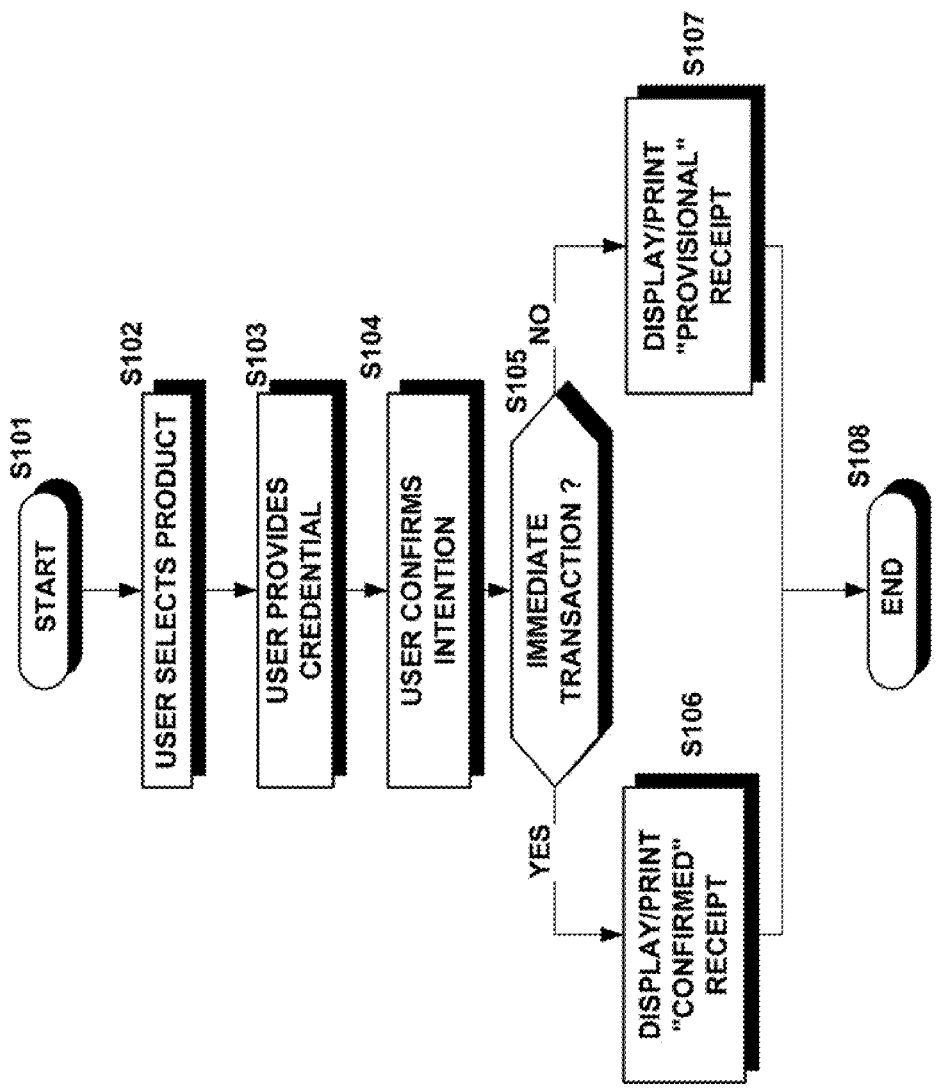
FIG. 10 is a flowchart of a transactional model for providing "Provisional" and "Confirmed" receipts of a trusted lightweight e-commerce transaction, according to an embodiment of the present invention.

FIG. 10 is a flowchart of a transactional model for providing "Provisional" and "Confirmed" receipts of a trusted lightweight e-commerce transaction, according to an embodiment of the present invention. As shown therein, the transaction starts at S101 and the user (not shown) selects a product and/or services provided by provider of such products and/or services, as shown at S102. At S103, the user provides any requested credentials, such as any requested and/or required authentication and/or payment instrument information, as shown at S103. The user may then be presented with an opportunity to confirm the selected product(s) and/or services at S104.

Transactions that are accepted by the remote server 534 in a predetermined and/or selectable short period of time (such as on the order of 1 second for example) are named "immediate transactions" herein. When it is determined at step S105 that the current transaction is an immediate transaction (such as when a transaction confirmation is received from the remote server 534 within the predetermined and/or selectable short period of time), the user is given a "confirmed acknowledgement" (or receipt, as the terms acknowledgment and receipt are used interchangeably herein) as shown at S106. When immediate transactions are not possible (such as when a transaction confirmation is not received from the remote server 534 after expiry of the predetermined and/or selectable short period of time), the user is given a "provisional acknowledgment" or receipt, as shown at S107. The transaction may then end at S108. If the user has received a provisional acknowledgment, the user may request a confirmed acknowledgment at some later point in time, if the user so desires. Very quickly, the user will trust the reliability of the transaction strategy proposed herein, and will not bother to systematically request a confirmed acknowledgement/receipt when a provisional receipt has been issued. If in doubt, the user always has the option and ability of requesting a confirmed acknowledgement/receipt.

In the case of non-immediate transactions according to the present invention, the actual time to complete the overall transaction is preferably masked from the user. The user (person initiating the transaction) remains satisfied with the transaction because of the short period of time needed to complete the transaction. The reliability and the speed of completion of the overall transaction are ensured by relying on the "transaction master" model and the use of the trusted cache 212, as explained below.

Immediate Transaction

Figure 11:
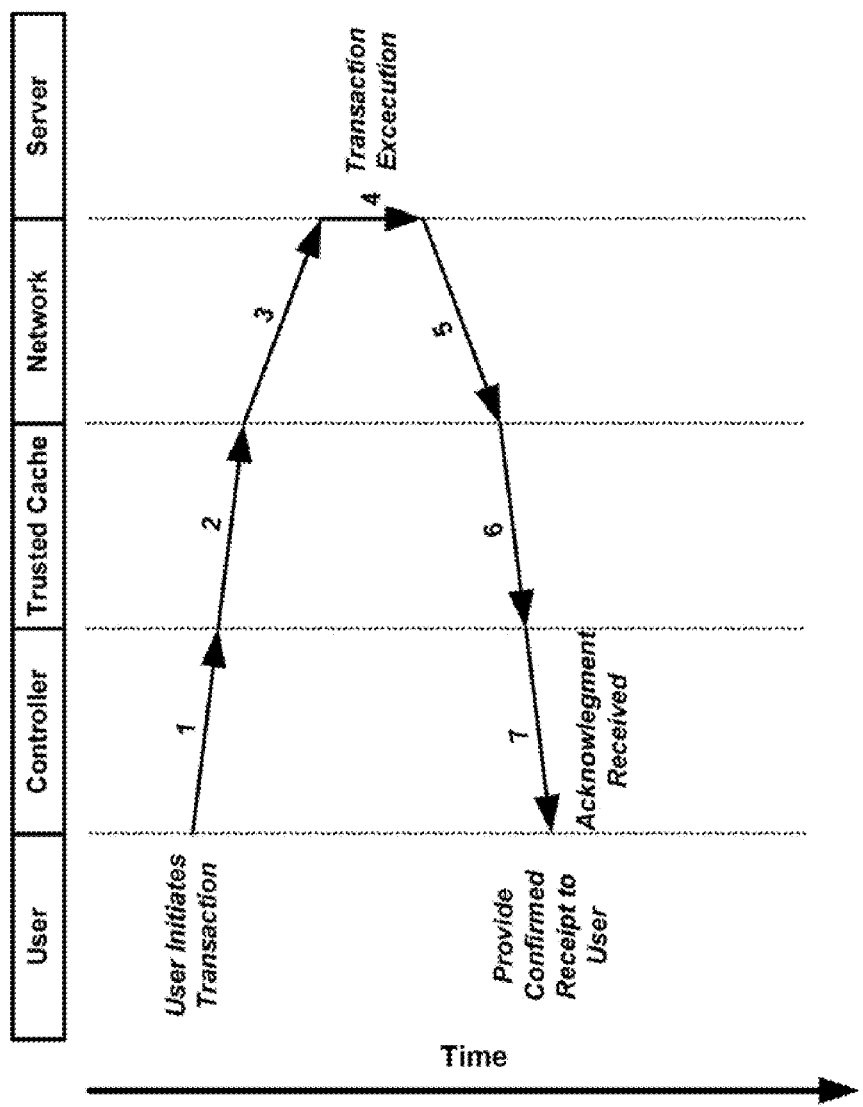
FIG. 11 is a diagram showing the timing of an immediate trusted lightweight transaction, according to an embodiment of the present invention.

FIG. 11 is a diagram showing the timing of an immediate trusted transaction as the transaction progresses from the user to the server 534 and back to the user, as a function of time, according to an embodiment of the present invention. When an immediate transaction is possible, the transaction may proceed as follows. When initiating a transaction, the user may supply one or more of the following: an identification of the desired product and/or service, the identity of the supplier(s), the user's personal information and/or payment instrument information (which may be inputted by the user or retrieved automatically from secured personal storage), for example. As shown at (1), the TTC according to the present invention may encapsulate all the user-supplied aforementioned information in a single packet (all such sensitive data being preferably secured in accordance with a predetermined security/encryption protocol), and may then store a copy of the packet into the trusted cache 212, as shown at (2). The packet may then routed through the network (3) (including, for example, the Internet 104) until it reaches the remote server 534. The information related to the item(s) chosen, together with the personal information and/or payment instrument information and the delivery address are sent to the remote server 534 in the same single packet. The sensitive information may be encrypted using, for example, the provider's public key that is automatically made available together with the rich content describing the product or service, thereby avoiding the unnecessary overhead of establishing a full SSL or Transport Layer Security (TLS) session. The remote server 534 may then complete the transaction (4) and may return a confirmed acknowledgment packet back through the network (5). A copy of the returned confirmed acknowledgment packet may then be copied to the trusted cache 212 (6), and a receipt may be generated by the TTC (7) that is then displayed or printed or otherwise provided to the user.

Cached Transaction

Figure 12:
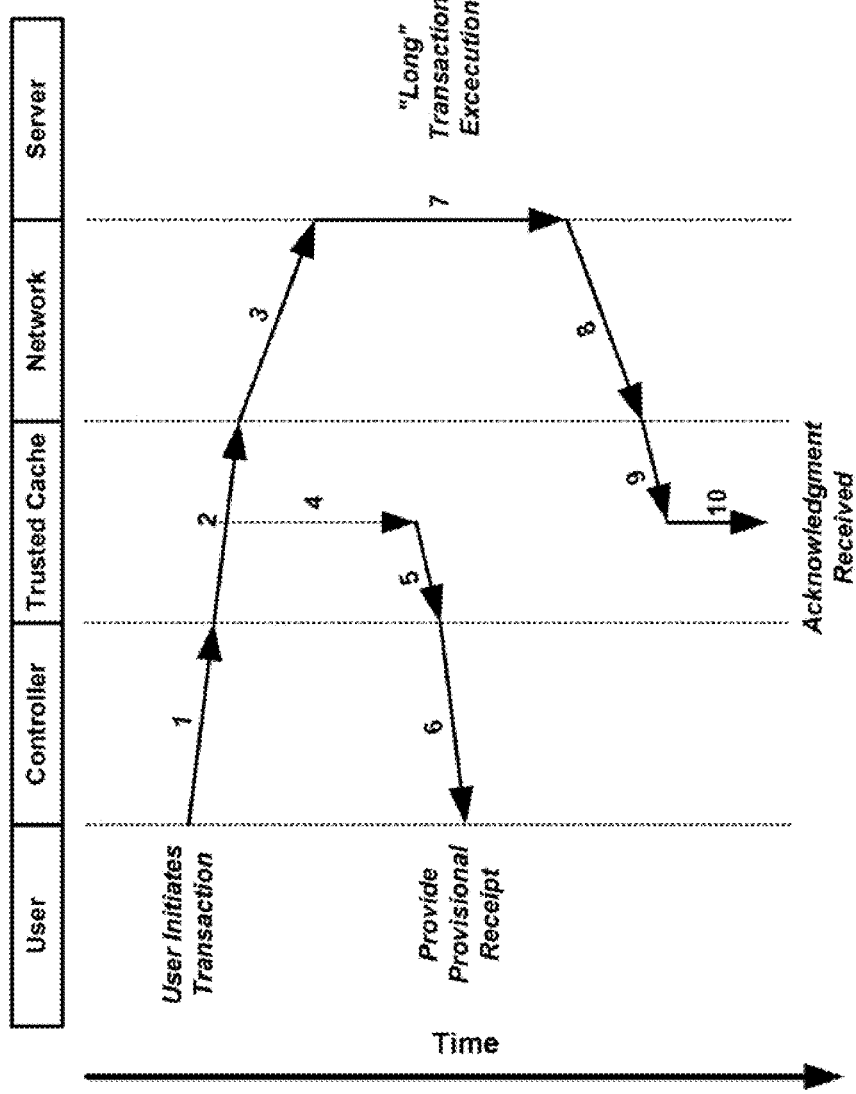
FIG. 12 is a diagram showing the timing of a cached trusted lightweight transaction, according to an embodiment of the present invention.

When an immediate transaction is not possible, a cached transaction is executed. FIG. 12 is a diagram showing the timing of a cached trusted lightweight transaction as the transaction progresses from the user to the server 534 and back to the user, as a function of time, according to an embodiment of the present invention. When initiating a transaction, the user supplies one or more of the following: an identification of the desired product and/or service, the identity of the supplier(s), the user's personal information and/or payment instrument information (which may be inputted by the user or retrieved automatically from secured personal storage), for example. The TTC, as shown at (1), may then encapsulate all of the aforementioned information in a single packet (all such sensitive information being secured in accordance with a predetermined security/encryption protocol), and may then store a copy of the packet in the trusted cache 212 (2), such as shown at 212 in FIGS. 2 and 3. The packet may then be routed through the network (3) (including, for example, the Internet 104).

After a predetermined time-out (4), a provisional acknowledgement packet (5) is produced based on the user transaction request already committed to the trusted cache 212. The TTC of the present invention may then generate a provisional acknowledgement (6) that is viewed or printed or otherwise made available or provided to the user.

After a certain amount of time, the remote server 534 completes the transaction (7) and may return a confirmed acknowledgment packet back through the network (8). A copy of the returned confirmed acknowledgment packet may then be copied to the trusted cache 212 (9), and the confirmed acknowledgment may be retained in the trusted cache 212 (10). This execution flow has the advantage of providing the user with a provisional acknowledgment very shortly after the user has initiated the transaction, even if a confirmed acknowledgment is not available until some later time. The user retains the option of returning to the device that incorporates the TTC of the present invention and requesting a confirmed acknowledgment corresponding to the previously provided provisional acknowledgment.

Failed Transaction

Figure 13:
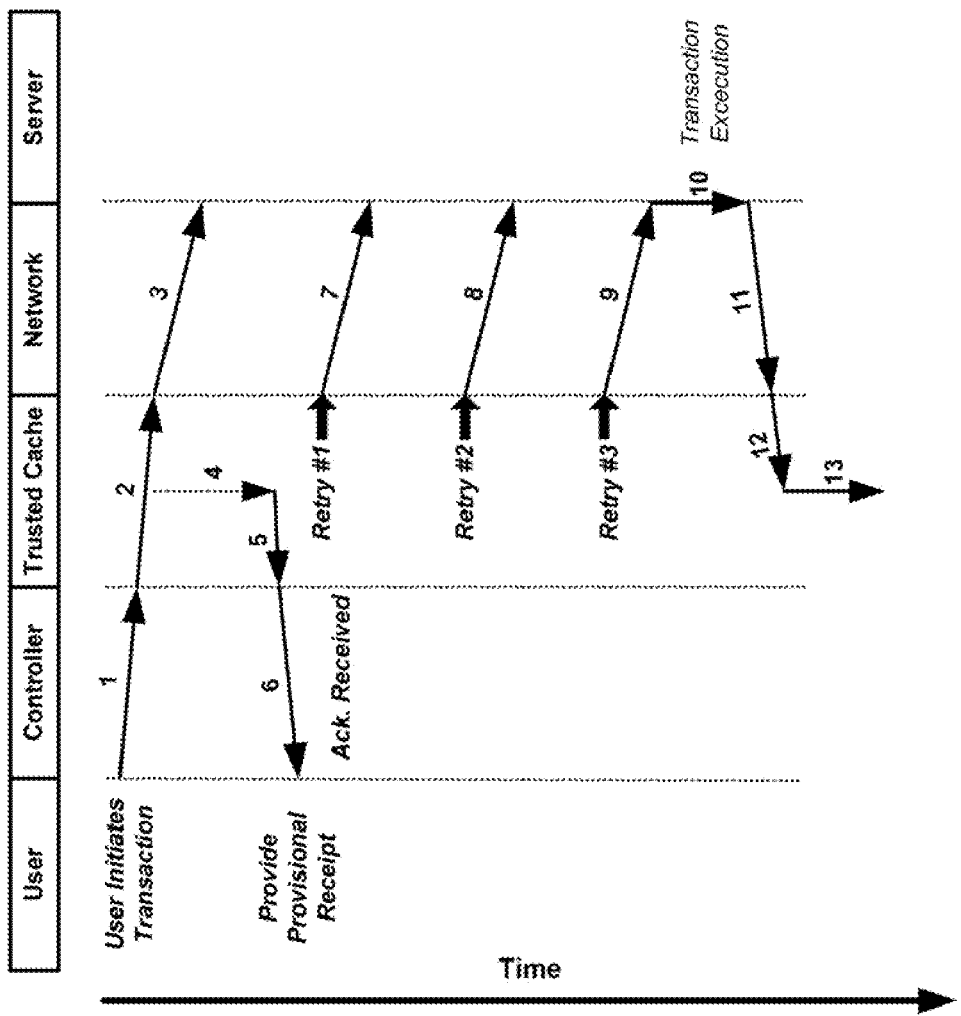
FIG. 13 is a diagram showing the timing of a failed trusted lightweight transaction, according to an embodiment of the present invention.

FIG. 13 is a diagram showing the timing of a failed trusted lightweight transaction as the transaction progresses from the user to the server 534 and back to the user, as a function of time, according to an embodiment of the present invention. When initiating a transaction, the user may supply one or more of the following: an identification of the desired product and/or service, the identity of the supplier(s), the user's personal information and/or payment instrument information (which may be inputted by the user or retrieved automatically from secured personal storage), for example. The TTC (1) may the encapsulate all of the aforementioned information in a single packet (all such sensitive information being secured in accordance with a predetermined security/encryption protocol), and may then store a copy of the packet in the trusted cache 212 (2), such as shown at 212 in FIGS. 2 and 3. The packet may then be routed through the network (3) (including, for example, the Internet 104).

After a predetermined time-out (4) has elapsed without the generation of a confirmed acknowledgment packet by the server 534, a provisional acknowledgement packet (5) may be produced by the TTC itself, based on the user transaction request already committed to the trusted cache 212. The TTC of the present invention may then generate a provisional acknowledgement (6) that is viewed or printed or otherwise made available or provided to the user.

When the cached transaction packet (3) fails to reach the remote server 534, a first re-try packet (7) is sent through the network after a predetermined and/or selectable period of time. If no acknowledgement is received from the remote server 534 after a predetermined and/or selectable period of time, a second retry packet (8) is sent to the network. The same scenario may be repeated forever or (preferably) for a selectable number or retries or period of time or until an acknowledgement is received from the remote server 534.

In the example illustrated in FIG. 13, the third retry packet (9) reaches its destination (the remote server 534) and the transaction is successfully executed (10). A confirmed acknowledgment is routed back through the network (11). A copy of the returned acknowledgment packet is copied to the trusted cache 212 (12), and a confirmed acknowledgment may be retained in the trusted cache 212 (13) and optionally provided to the user upon request.

Such a transaction model, whereby the TTC is the transaction "master" that initiates the transaction with the remote server 534 and repeats forever or for a predetermined number of times until a valid transaction acknowledgment from the remote server 534 is received, is extremely robust albeit lightweight (the transaction consists of single forward packet and a single return packet). This enables a the remote server 534 to handle a great many such transactions simultaneously without becoming overwhelmed by the data traffic necessary to complete such a great number of transactions. Moreover, there is no need to identify the exact location and type of failure or to initiate a specific recovery. Indeed, any failure, whether on the outbound network path (i.e., toward the remote server 534), at the remote server 534 or on the network return path (from the remote server 534 back toward the user) may be automatically recovered according to this transaction model. Any duplicate packet that may be received at either end may simply be ignored.

It is to be noted that the user is not aware of the possible delay in receiving the acknowledgement from the remote server 534. This feature is expected to be appreciated by users, especially when performing numerous micro-payments, as servers conventionally take a long time to get approval from clearing banks.

Confirmed Acknowledgment Request

Figure 14:
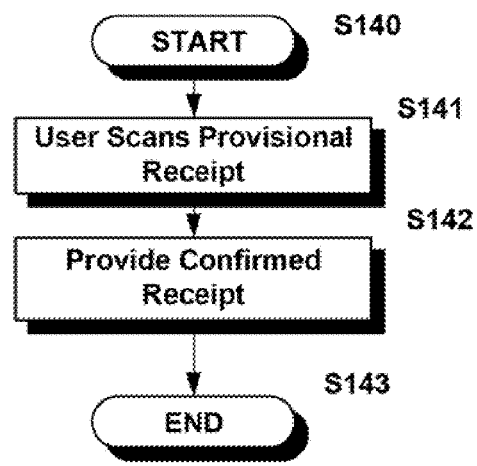
FIG. 14 is a flowchart of a request for a confirmed acknowledgment, according to an embodiment of the present invention.

FIG. 14 is a flowchart of a request for a confirmed acknowledgment, according to an embodiment of the present invention. Whenever the user is given a provisional acknowledgment, the user may, at some later time, request a corresponding confirmed acknowledgment. If the device incorporating the TTC according to the present invention is equipped with a ticket or receipt printer and a barcode scanner (or other machine vision system), the user may initiate a request for a confirmed acknowledgment at S140 in FIG. 14 by simply presenting the previously received provisional acknowledgment to the bar code scanner and scan a barcode (or other machine readable indicia) printed on the provisional acknowledgment as shown at S141 and the device prints out a confirmed acknowledgment (a ticket or receipt) as shown at S142 to complete the request at S143, in accordance with the procedures detailed below.

"In-Cache" Confirmation Transaction

Figure 15:
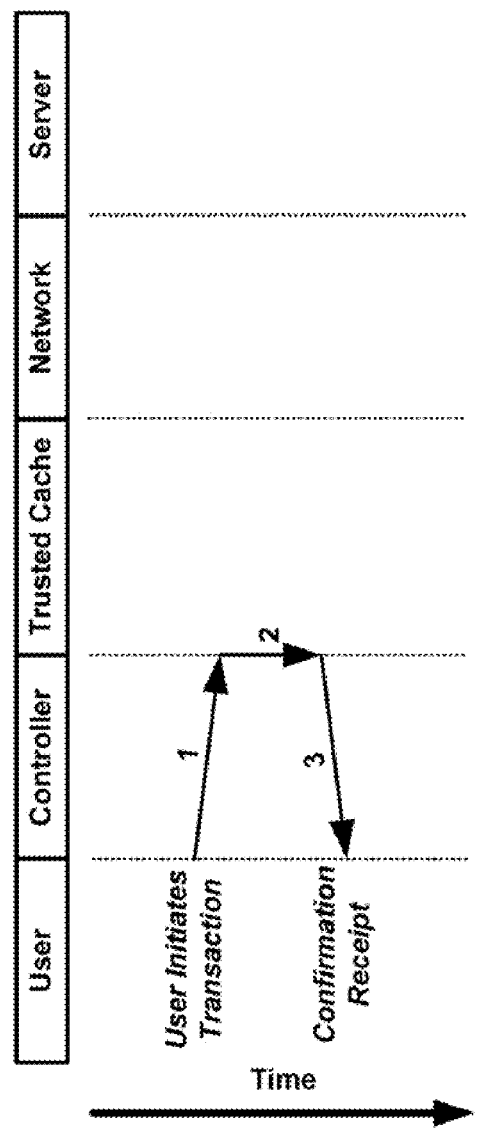
FIG. 15 is a diagram showing an in-cache confirmation of a trusted lightweight transaction, according to an embodiment of the present invention.

FIG. 15 is a diagram showing an in-cache confirmation of a trusted lightweight confirmation, according to an embodiment of the present invention. Depending on the time taken by the remote server 534 to complete the transaction, the confirmed acknowledgment may already be available in the trusted cache 212. In that case, the user need only present the previously received provisional acknowledgment to the device incorporating the trusted controller of the present invention and the request (1) may be immediately responded to with the relevant data contained in the trusted cache 212 (2), and a confirmed acknowledgment generated (3) and printed, displayed or otherwise made available to the user.

"Out-of-Cache" Confirmation Transaction

Figure 16:
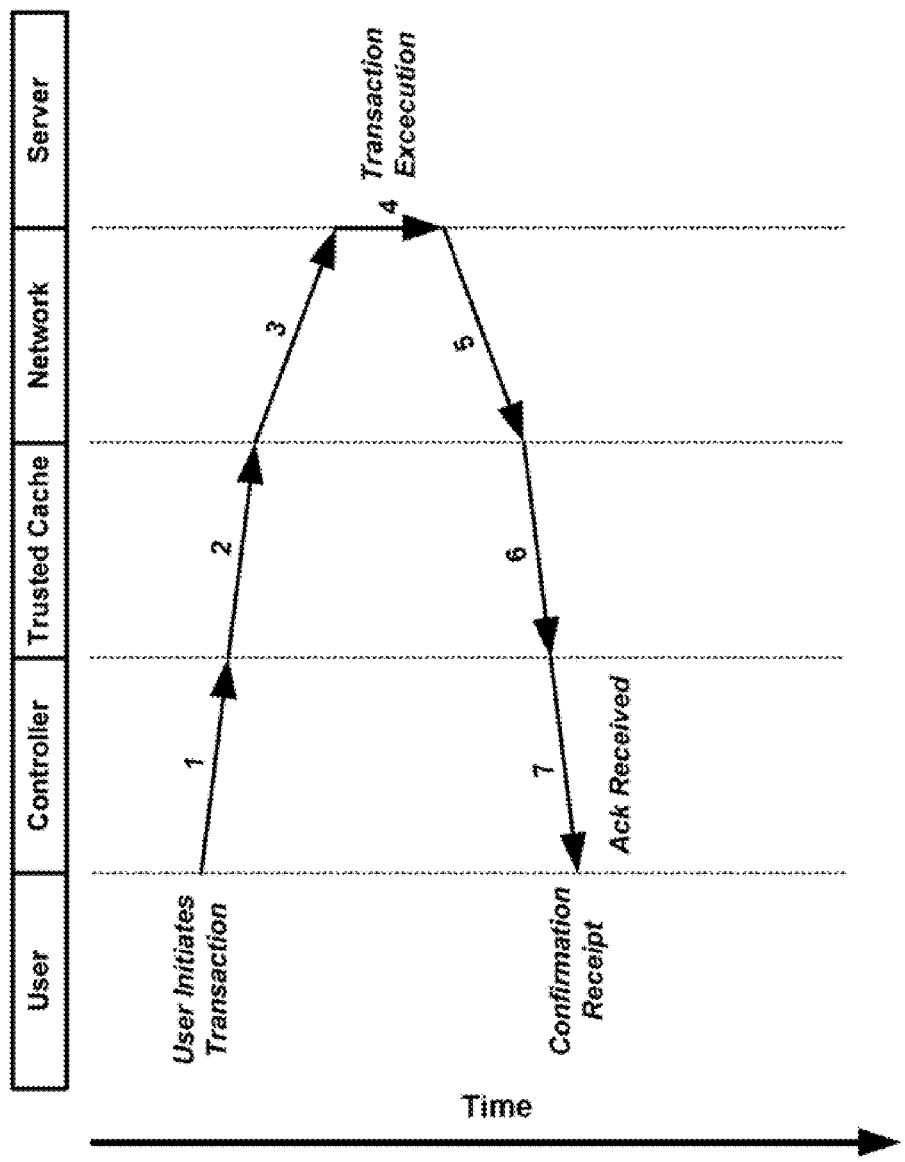
FIG. 16 is a diagram showing the timing of an out-of-cache confirmation of a trusted lightweight transaction, according to an embodiment of the present invention.

FIG. 16 is a diagram showing the timing of an out-of-cache confirmation of a trusted lightweight transaction, according to an embodiment of the present invention. If the confirmed acknowledgement is not present in the trusted cache 212 (for whatever reason), the request therefor is forwarded to the remote server 534 via the outbound path (1) (2) and (3) through the controller, trusted cache 212 and the network, whereupon the remote server 534 sends back a transaction confirmed acknowledgment (4) that is routed back to the TTC via the return path (5) (6) and (7). If the remote server 534 does not respond due to some failure along the way, the TTC of the present invention may continuously repeat the request for confirmed acknowledgment until a reply is received. When the remote server 534 has completed the earlier-initiated e-commerce transaction, it will cache the confirmed acknowledgment such that a subsequent request from the TTC can be immediately responded to and the confirmed acknowledgment sent from the remote server's 534 cache to the trusted cache 212 of the trusted controller of the present invention. If the confirmed acknowledgement is not ready, it will simply ignore the request therefor, thereby forcing the TIC to repeat the request after a predetermined time until the confirmed acknowledgment is received. In the end, a confirmed acknowledgment is generated and provided to the user, the confirmed acknowledgment indicating either success of the transaction or failure thereof (due, for example, by the user's payment instrument being declined).

Transaction Session

Figure 17:
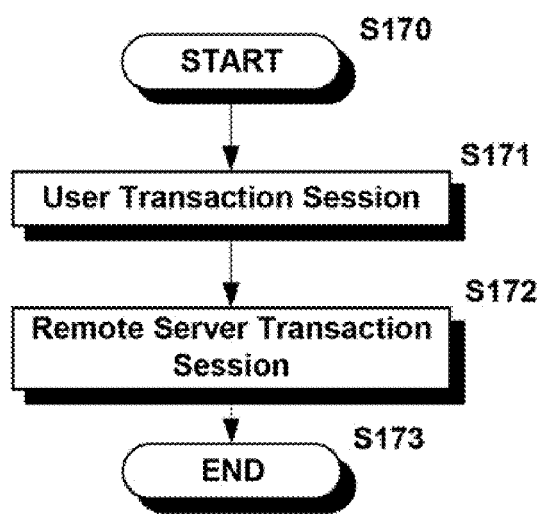
FIG. 17 is a flowchart of a transaction session, according to an embodiment of the present invention.

FIG. 17 is a flowchart of a transaction session, according to an embodiment of the present invention. The overall trusted transaction session called a "Transaction Session" that begins at S170 and ends at S173 that is executed by the TTC control software comprises two sessions; namely a User Transaction Session S171 followed by a Remote Server Transaction Session 172, the details of which are discussed below.

User Session

Figure 18:
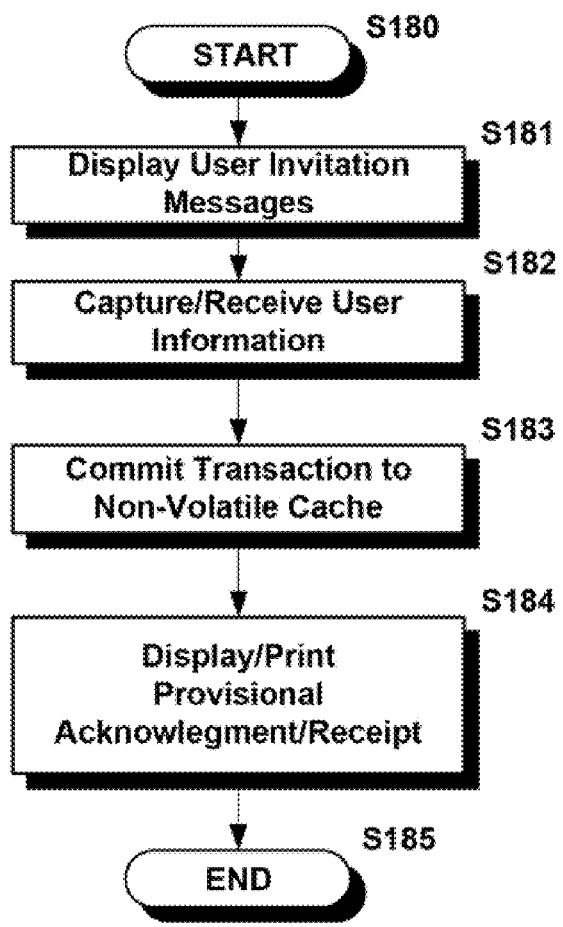
FIG. 18 is a flowchart of a user session, according to an embodiment of the present invention.

FIG. 18 is a flowchart of a user session, according to an embodiment of the present invention. The user session begins at S180 and ends at S185 and may include one or more of the following intervening steps. As shown at S181, a display may invite the user to initiate a purchase for a product and/or service. The user may then confirm his or her intention to initiate a purchase. The user's personal and/or financial information (identity, payment instrument details, etc.) may then be captured and/or inputted into the device incorporating the TTC according to the present invention, as shown at S182.

The TTC thus captures the user's personal and/or payment credentials using some means of interaction, or alternatively from secured personal storage accessible to the TTC control software. The TTC control software may then commit the transaction to the non-volatile trusted cache 212, as shown at S183, after which the TTC may provide, display or print a provisional acknowledgment for the user, as shown at S184. According to the present invention, the user need only be involved during the user session S180-S185, which may take only a few seconds or even less if bar-coded (or machine readable) items are scanned by the barcode (for example) reader.

Server Session

Figure 19:
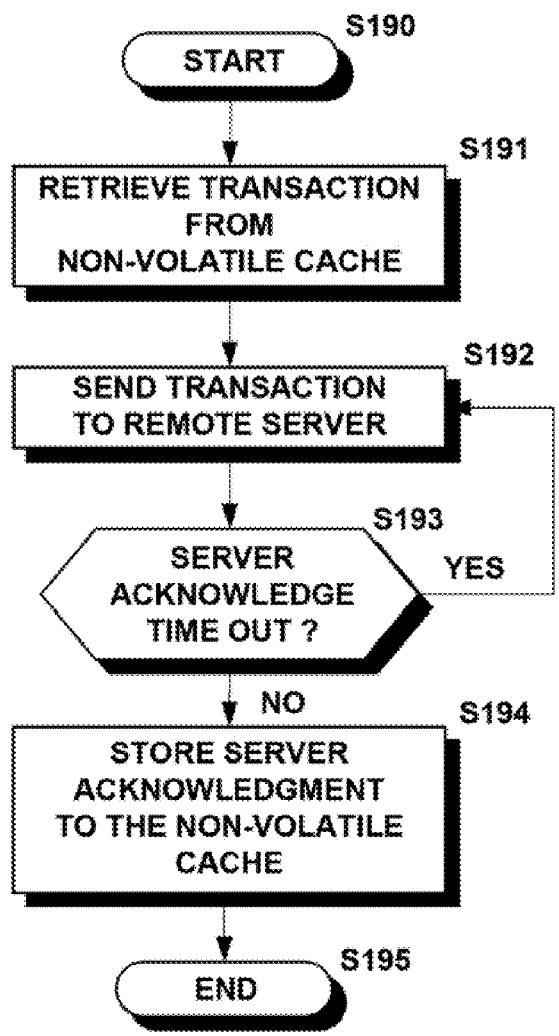
FIG. 19 is a flowchart of a server session, according to an embodiment of the present invention.

FIG. 19 is a flowchart of a server session from its initiation at S190 to the conclusion thereof, at S195, according to an embodiment of the present invention. According to the present invention, the server session may include one or more of the following steps. As shown at S191, the TTC control software retrieves the transaction committed in the non-volatile trusted cache 212 during the user session. The TTC then sends the transaction to the remote server 534 over a computer network or other communication channel, as shown at S192. If no acknowledgement is received from the remote server 534 by a predetermined and/or selectable timeout period, the TTC of the present invention may continually (or for a predetermined period of time or for a predetermined or selectable number of attempts) resend the transaction packet to the remote server 534, as indicated at S193. If the acknowledgment is indeed received by the TTC before the timeout period has elapsed, the received acknowledgment may be stored in the NVRAM 302 of the trusted cache 212. As is apparent from FIG. 19, the user of the TTC of the present invention (or the user of the device incorporating the present TTC) is not involved in the remote server 534 session. Optionally, the TTC control software may notify the user of the successful completion of the transaction by printing or otherwise providing the confirmed acknowledgment automatically, such as by sending an email to the user or by activating an alert message, to name a few possibilities.

In order for a transaction session to complete successfully without involving the user, it is necessary to examine all the failure situations that may interfere with the completion of the transaction. A formal methodology called Failure Modes, Effects and Criticality Analysis (FMECA) is useful in exhaustively identifying all possible failure possibilities, their impact and the effectiveness of the remedies.

The most common cause of transaction failure may be caused by the remote server 534 failing to timely respond with an acknowledgment of the transaction, for whatever reason (including, for example, a failure at some point along the communication path outside the TTC). An effective remedy to such a failure is the transaction model described above, whereby the TTC is the transaction "master" that initiates and maintains control over the transaction with the remote server 534. Advantageously, the TTC according to the present invention may repeatedly send the transaction to the remote server 534 until a valid transaction acknowledgment is received from the remote server 534. The second common cause of transaction failure may be attributed to failure of the TTC, due to mains power-failure, user power down, software crash and/or hardware latch-up, for example. An effective remedy to such failures is the use of a non-volatile data cache 302 of the trusted cache 212 in which the critical states of the transaction are frequently saved. The control software of the TTC may then recover the context of the transaction from the critical state information stored in the trusted cache 212, and then resume its execution and control over transaction until completion thereof.

Transaction Critical States

Figure 20:
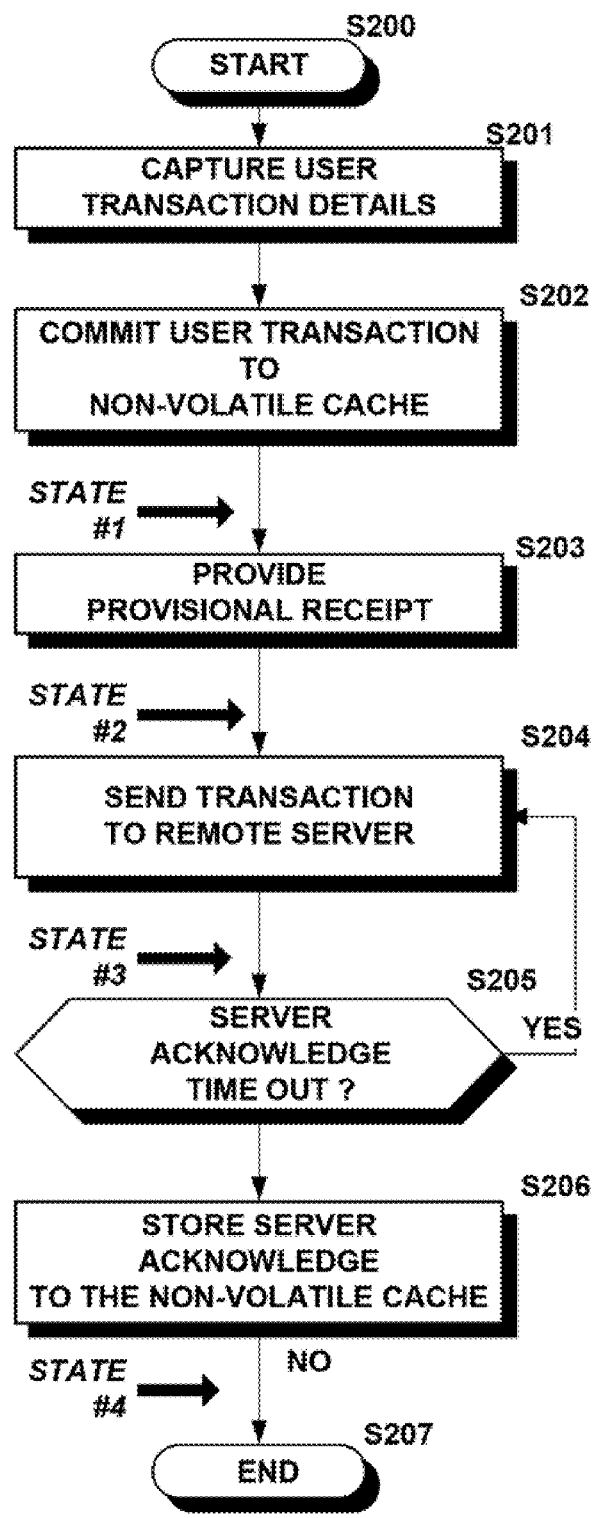
FIG. 20 is a flowchart showing the timing of the saving of the critical states of a trusted lightweight transaction, according to an embodiment of the present invention.

FIG. 20 is a flowchart showing the timing of the saving of the critical states of a trusted lightweight transaction, according to an embodiment of the present invention. The essential critical states are State#1, State#2, State#3, and State#4, as shown in the flowchart. The present invention provides for the saving in the trusted cache 212 of all the data necessary to describe the context of the transaction at that particular instant, including the state number itself. This saving of the critical states may be carried out four times per transaction as shown in FIG. 20, or more or less often as necessary. Following a failure of the transaction, the TTC and/or the remote server 534 occurring between any of these critical states, the present TTC may retrieve the last saved state information from the trusted cache 212 and seamlessly resume and complete the execution from the saved state onward. As shown in FIG. 20, the method beings at S200, whereupon the present TTC captures (or retrieves) the user's personal and/or financial information. In step S202, after the user has selected products and/or services and committed to a transaction, the details of the user's transaction are committed to the NVRAM 302 of the trusted cache 212. The TTC of the present invention may then save all of the information necessary to reconstruct and continue the transaction to non-volatile memory 302, as shown at State#1. At S203, the TTC may print, display or otherwise provide the user with a provisional acknowledgment or receipt. This state of the transaction (State#2) may then also be saved to non-volatile memory 302. The user's transaction may then, as shown at S204, be sent to the remote transaction server 534, and the current state information may then again saved to non-volatile memory 302, as shown at State#3. As indicated at S205, step S204 may be repeated (indefinitely if necessary) until a timely acknowledgment is received from the remote server 534. Alternatively, step S203 may be omitted between steps S202 and S204 and carried out only when the remote server 534 initially fails to send a timely acknowledgement back to the present TTC. Upon receiving an acknowledgment from the remote server 534, the present TTC may store the received acknowledgement and all necessary contextual information to the non-volatile memory 302, as shown at State#4, whereupon the method ends at S207.

Recovery from Trusted Transaction Controller Temporary Failure

Figure 21:
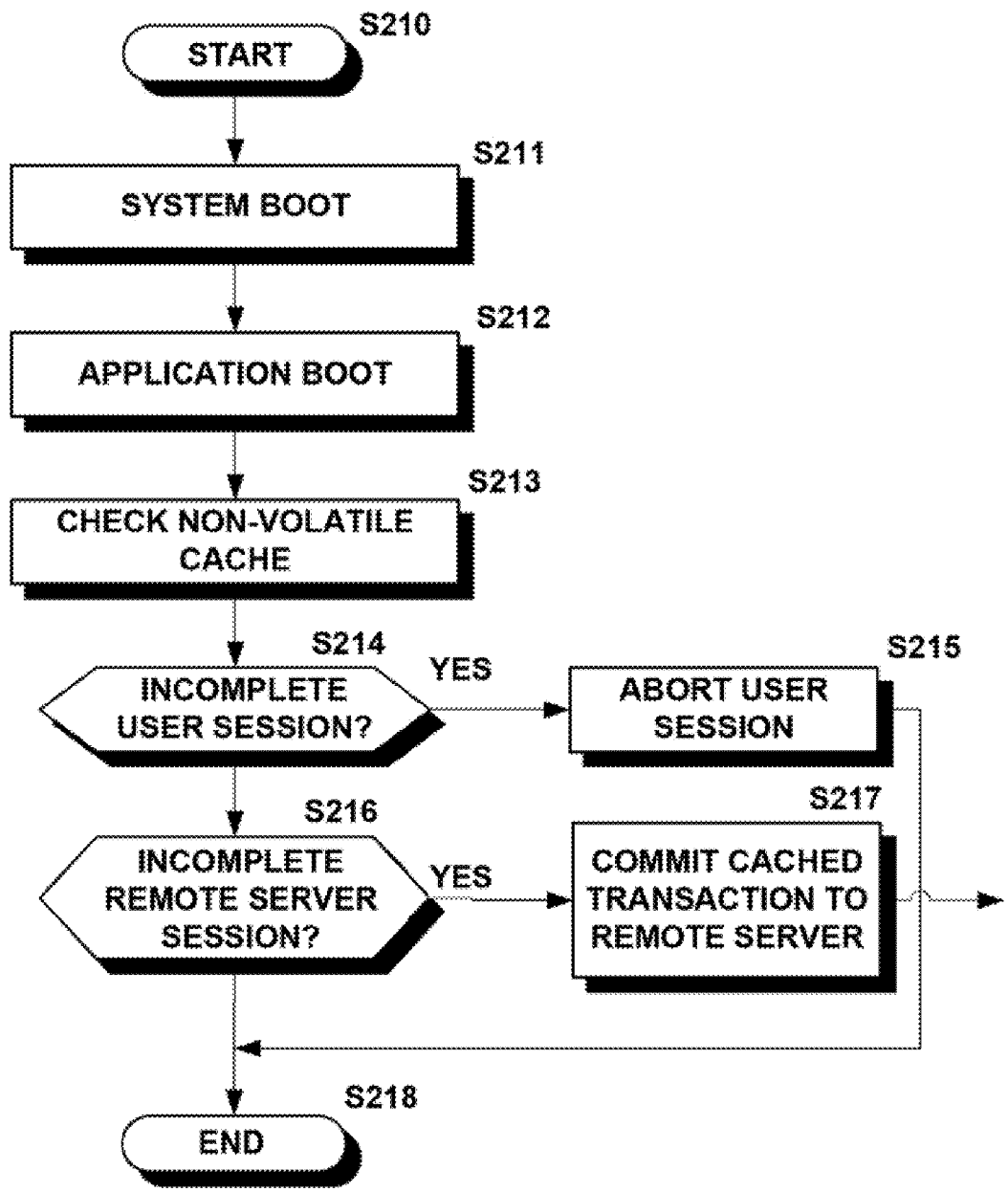
FIG. 21 is a flowchart illustrating the recovery from a temporary failure of a TTC, according to an embodiment of the present invention.

FIG. 21 is a flowchart illustrating the recovery from a temporary failure of a TTC, according to an embodiment of the present invention. Assuming a successful recovery cycle following a temporary failure whereby the TTC is successfully re-started, the TTC may execute the steps S210-S218 shown in the flowchart of FIG. 21. Namely, the operating system of the present TTC may reboot as shown at S211 and the application may start-up or boot as shown at S212. Thereafter, the CPU 202 (see FIGS. 5 and 6) may examine the contents of the trusted cache 212, as shown at S213. If the last saved critical state (see FIG. 20) indicates that a user session is not completed at S214, the TTC may abort the user session, as shown at S215 and end the recovery, as shown at S218. If it is determined step in S216, however, that the last critical state saved shows that a remote server 534 session is incomplete, the saved state information may be retrieved from the trusted cache 212 and the transaction committed (sent) to the remote server 534, as shown at S217. The content of the trusted cache 212 may be encrypted or digitally signed, in order to prevent tampering during the transaction recovery process, by service people (for example) if the present TTC is sent for repair or service.

It is to be noted that the user may choose not to receive a provisional acknowledgment (ticket). In that case, only the confirmed acknowledgment will be printed or otherwise provided whenever the acknowledgement is received from the remote server 534. In either case, the user need not wait in front of the display screen for the overall transaction to complete, and would therefore be afforded additional time to fully enjoy the shopping and/or entertainment experience provided by the present TTC.

As noted above, the present TTC (and not the remote server 534) is the transaction "master". Therefore, user personal and payment instrument information and the like are supplied to the remote server 534 under the full control of the TIC, including recovery from failure. Consequently, users will very quickly come to trust such a system, especially when many small merchants are involved in such e-microcommerce transactions that depend upon frequent micro-payments.

Biometric Data and the Trusted Transactional Controller

Figure 22:
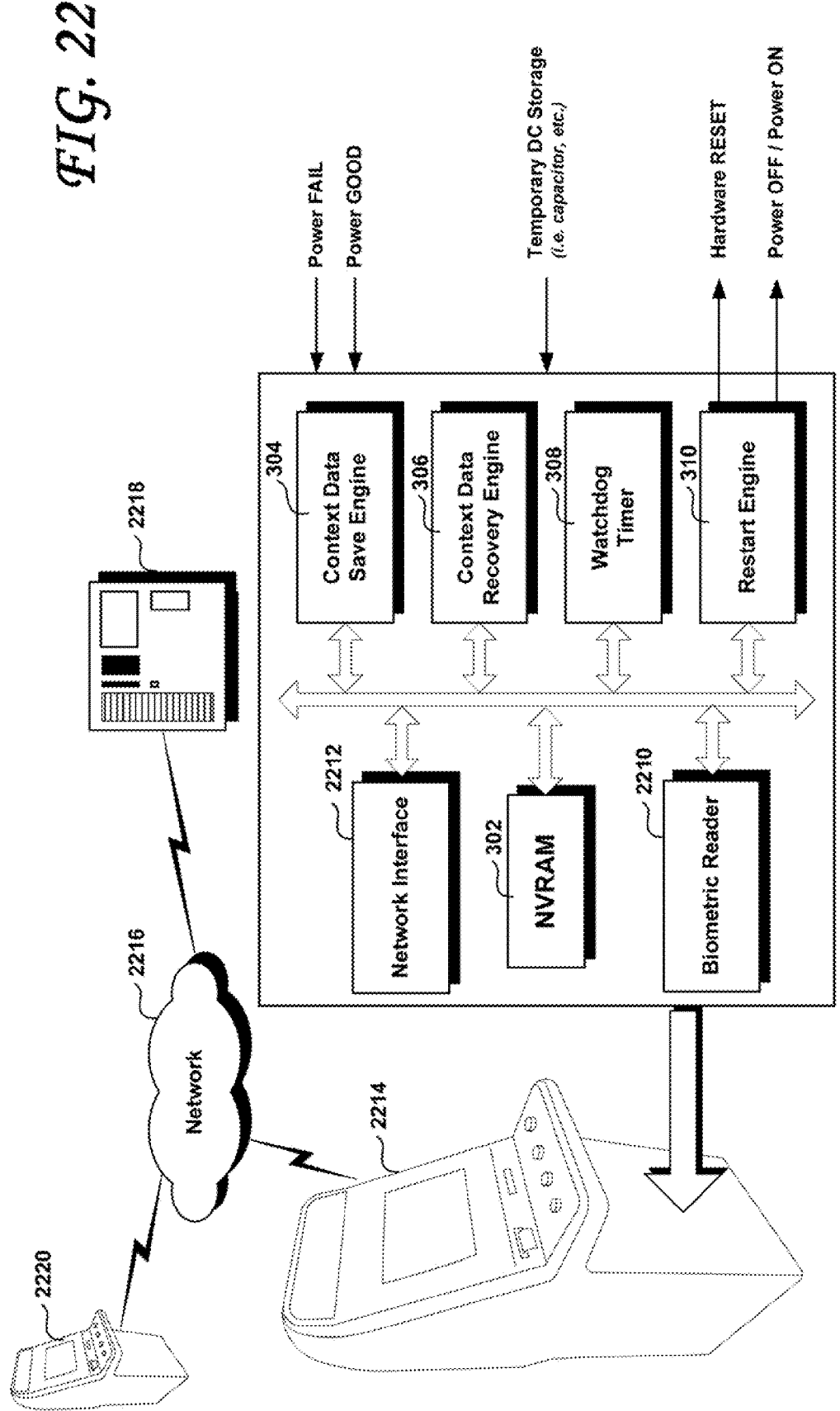
FIG. 22 shows a TTC and a gaming machine incorporating same, according to embodiments of the present invention.

The TTC, or the device within which the TIC is incorporated, may include a biometric data reader, such as shown at 2210 in FIG. 22. Such a biometric data reader 2210 is configured to capture biometric data of the user of the TTC such as, for example, a player of a gaming machine. The biometric reader 2210 preferably includes one or more sensors to collect the biometric data and to convert the collected biometric information into a digital format. The biometric reader may include its own processor to carry out signal processing on the digital biometric data, or may offload the processing of the collected biometric data onto the CPU 202 of the TTC or onto the processor(s) of one or more remote servers coupled to a network, such as shown at 2216 in FIG. 22. Toward that end, the TTC may include a network interface 2212, as also shown in FIG. 2. Wherever such signal processing is carried out, the signal processing algorithms process the biometric data and utilize a matching algorithm to match the collected biometric data against previously stored biometric data (e.g., a template) for the same user. When a match between the captured biometric data and previously captured and stored biometric data is found, the user or player may be said to have been identified. As no two biometric data sets may be identical, a decision process is necessary to determine when two biometric data sets may be considered to be a match. Suitable biometric data may, for example, include fingerprint data, iris scan data, retinal scan data, voice print data, facial feature data, hand geometry data and static or dynamic signature data, to name but a few possibilities. In general, biometric data collected by the biometric reader 2210 may include any kind of data associated with a measurable anatomical, physiological and/or behavioral characteristic of the user or player. For example, the biometric data may also include such disparate data as keyboard keystroke dynamics data, gait or body recognition data or facial thermography data.

The TTC of FIG. 22 may be incorporated within a gaming machine, such as shown at reference 2214 in FIG. 22. Such a gaming machine 2214 may be found in a casino or elsewhere, and may incorporate a TTC having a biometric reader for player identification. Using such a biometric reader enables the gaming machine to identify the user or player with a high degree of confidence, without requiring the user to memorize username and password combinations, carry a player ID card or token. This enables the device or gaming machine to offer media-less player identification functionality. The gaming machine or other device within which the present TTC is incorporated may also be configured for cash-less and/or for cash payment. In this regard, the player's biometric data, once verified, may serve the purpose of or may complement a cashless payment instrument, as the player's verified biometric data may be associated with a unique identification code in a local or remote database coupled to a network 2216, as well as to one or more bank accounts, credit cards or other payment modalities.

For example, biometric data captured by the biometric reader 2210 may serve to strengthen the security of existing identification (ID) instruments, or replace them altogether. Such ID instruments may include, for example, a printed ticket with text and/or encoded barcode, a printed ticket with text and/or embedded encoded magnetic strip, a magnetic ID card, a smart ID card, ID buttons, ID key-chains, a personal electronic wallet, a secure handheld computer, a secure mobile phone, a secure computer wrist watch, a bar-coded ticket, a bar-coded voucher, for example. Enabling the gaming machine or other device that incorporates the TTC and/or the underlying functionality thereof to capture biometric data provides yet another layer of security for the user, and protects the casino operators (for example) against repudiation claims in which players claim that their payment or identification instrument was stolen and misused or that they did not authorize and/or participate in the gaming activity themselves.

According to other embodiments of the present inventions, biometric data may be used to enable the player of a gaming machine 2214 to securely suspend a game in progress, to save the current state thereof and to return, at a later time, and resume the suspended game as of its saved state, upon providing matching biometric data the gaming machine. That is, the gaming machine 2214 captures the player's biometric data at the initiation of the game and again later when he or she requests that the gaming session or specific game be resumed, whether at the same or a different gaming machine. Only if the later captured biometric information is considered to match the previously stored biometric information for that player will the gaming machine 2214 enable the game or session to resume as of the moment and/or game state at which it was previously suspended. This enables the player to play, request a suspension of game play, take a break and return at a later time to resume game play, upon providing matching biometric data to the gamine machine.

A gaming machine, according to embodiments of the present invention, may include one or more processors such as shown at reference 202 in FIGS. 5 and 6, the processor being configured to execute one or more game programs and carry out other housekeeping, accounting, identification and security-related functions. A biometric reader 2212 may be provided as part of the trusted cache 212, the TTC or, for example, as a discrete modular and field replaceable element coupled to the bus 216. However configured, the biometric reader is designed to capture a first biometric data set from the player; i.e., is designed to derive a first biometric data set from the player's fingerprint, facial features, iris or retinal structure, etc. The gaming machine 2214 of this embodiment may also include a nonvolatile memory such as shown at 302 in FIG. 22, in which the captured first biometric data set may be stored. When a player desires to suspend game play, a context data save engine 304 saves the context of the game program to the nonvolatile memory 302 and associates the stored first biometric data with the saved context of the program. The saving of the context (including all game program state information) and the association of the first biometric data set therewith enables the gaming machine (and/or remote central server, such as shown at 2218 in FIG. 22) to associate the saved context with a strong identification of the player. This association enables the player, at a later time, to securely re-identify him or herself and to seamlessly resume game play as of the point at which game play was previously suspended.

To resume a previously suspended game or gaming session, the player requests the resumption of the game. The player will be required to identify him or herself to the gaming machine (or remote central server 2218) by providing a second biometric data set thereto, to prove his or her identity. If the captured second biometric data set matches (by whatever matching algorithm and criteria are established) the stored first biometric data set, the context data recovery engine 306 recovers the saved context from the nonvolatile memory 302 and loads the recovered context to enable continued execution of the program from the recovered saved context. The player may then continue playing the game, as if game play was never interrupted or may be reinstated within the game at a convenient point, such as the beginning of a last attempted level, for example.

The player's meters may be locally saved along with the context of the game program in the nonvolatile memory 302 and retrieved along with the saved context when the player wishes to resume game play. Should the player desire to resume game play at gaming machine that is different from the gaming machine at which game play was suspended, the new gaining machine may request and obtain both the meters and the saved context from the gaining machine at which game play was suspended. The meters may also be stored separately from the saved context of the game program, in that the context of the game program may be saved locally within the gaming machine but the meters may be saved remotely, within a central server 2218 coupled to a network 2216 accessible to the gaming machine 2214, for example. This enables a central management of the meters and enables each gaming machine within the network 2218 to request the meters directly from the central server, rather than polling other gaming machines to determine whether they store the player's meters or broadcasting a request for the player's meters to all gaming machines on the network. Alternately still, the context save engine 304 may store both the context of the game program and the player's meters at a remote location, such as within the server 2218. This makes it easy for the player to suspend game play at one gaming and resume game play at another gaming machine, such as gaming machine 2220 in FIG. 22. The gaming machine at which game play is resumed may then request both the player's meters and the saved context of the game program from the central server 2218 over the network 2216, load both the saved context and the meters, and enable continued game play on a gaming machine different from the gaming machine at which the player initiated game play and at which the player suspended his or her game play.

The gaming machine 2214 may incorporate a watchdog timer 308 that is configured to timeout and generate an alert signal unless periodically reset, as discussed relative to, e.g., FIGS. 7-9. A restart engine 310 may also be incorporated therein, with the restart engine being configured to initiate a controller restart cycle upon receiving the alert signal. For example, the restart engine 310 may initiate a three phase controller restart cycle, as shown and described above relative to FIG. 4. As shown therein, the three phase restart cycle may include a software reboot cycle, a hardware reset cycle and a power off cycle, with the hardware reset cycle only being initiated upon failure of the software reboot cycle and with the power off cycle only being initiated upon failure of the hardware reset cycle.

The second biometric data set captured by the biometric reader 2210 should be of the same type as the first biometric data set captured thereby, to enable a meaningful comparison of the two data sets. For example, both sets should be fingerprint data, iris scan data, retina scan data, voice print data, facial feature data, hand geometry data or signature data, to name but a few of the possibilities.

As noted above, the gaming machine 2214 may be configured, according to further embodiments of the present invention, such that the captured first biometric data set is sent over the network 2216, over the network interface 2212, to a central server 2218. When the player requests suspension of game play on the gaming machine 2214, the context data save engine 304 may save the context of the game program and send the player's meters and the saved context over the network interface 2212 to the central server 2218. Either in the gaming machine 2214 or within the central server 2218, an association is made between the first biometric data set and the saved context of the game program. When the player later requests resumption of game play on the gaming machine 2214 or another gaming machine (e.g., 2220) coupled to the network 2216, his or her biometric information is again captured by the biometric reader of the gaming machine on which the player is requesting resumption of the previously suspended game. The captured biometric information corresponds to the second biometric data set that is to be compared to the first biometric data set. According to one embodiment of the present inventions, the context data recovery engine 306 of the gaming machine on which the player is requesting resumption of game play causes the first biometric data set, the player's meters and the saved context to be requested and received from the central server 2218 over the network interface 2212. The received first biometric data set may then be compared, within the gaming machine, to the just-captured second biometric data set to determine if a match exists. If so, the game program is allowed to continue execution using the received saved context and the player's meters received from the central server 2218.

Alternatively, the just-captured second biometric data set may be sent to the central server 2218 and the matching of the stored first biometric data set with the just-received second biometric data set may be carried out within the central server 2218. Upon matching the two biometric data sets, the central server 2218 may send the saved context associated with the first biometric data set and the player's meters to the gaming machine from which the player requested resumption of game play, thereby enabling that gaming machine to seamlessly resume game play as if it had not been suspended at all, or enable the player to resume game play at a selected point in the game.

In the above-described embodiments, if the first biometric data set is found to not match the second biometric data set, resumption of game play will be disallowed. The user may, according to the application, be allowed to re-submit his or her biometric information, to enable the biometric reader 2210 to re-capture the user's biometric information, for the purpose of re-submitting the resulting second biometric data for comparison with the previously stored first biometric data set. This may be useful in cases in which the second biometric data set was corrupted by unintended movement on the player's part, inadequate lighting or any other reason.

Other embodiments of the present inventions include methods of securely executing a software, program of a user device such as, for example, a computer or a regulated gaming machine. Due to heightened security concerns, for example, there may be applications and instances where the user of a device will be called on to confirm his or her identity more than once during the execution of a program on the device. Such a method may be similar to that shown in FIGS. 7-9 and described above, with the player's biometric data set being substituted for the "secret keys" 808 in the check table 800. Such a method, therefore, may include a step of retrieving a timeout value 806 and a first biometric data set 810 from an entry in the check table 800. A counter may then be set to the retrieved timeout value and the counter started. At some point during the execution of the program on the device, the user is called upon to provide and the device to capture, second biometric data. The device then causes the first biometric data retrieved from the table to be compared and matched with the second biometric data captured from the user of the device, either locally or remotely. The execution of the software program may be interrupted if either the counter indicates that the timeout value has been exceeded or if the first biometric data retrieved from the table does not match the second biometric data captured from the player of the device.

There may be applications in which the user is repeatedly asked to provide and the device to capture, the user's biometric information, at selected checkpoints within a program. In this case, the same user repeatedly provides his or her biometric information to the device. There may also be applications in which in which different users must identify themselves to the computer program at different points in its execution. Such may the case when a higher level of authorization is required to provide final approval of a transaction or to approve a large jackpot, for example. For example, a C-Level corporate officer or other authorized personnel may be required to provide his or her final approval for the given online transaction. In that case, the first biometric data 810 in FIG. 8 may include the biometric data of more than one person, wherein the computer program requests the biometric information of different people at different checkpoints during the execution of the program. In that case, different people would be required to provide biometric information at different checkpoints and the matching thereof would be against correspondingly different first biometric data sets stored at 810 in FIG. 8.

Figure 23:
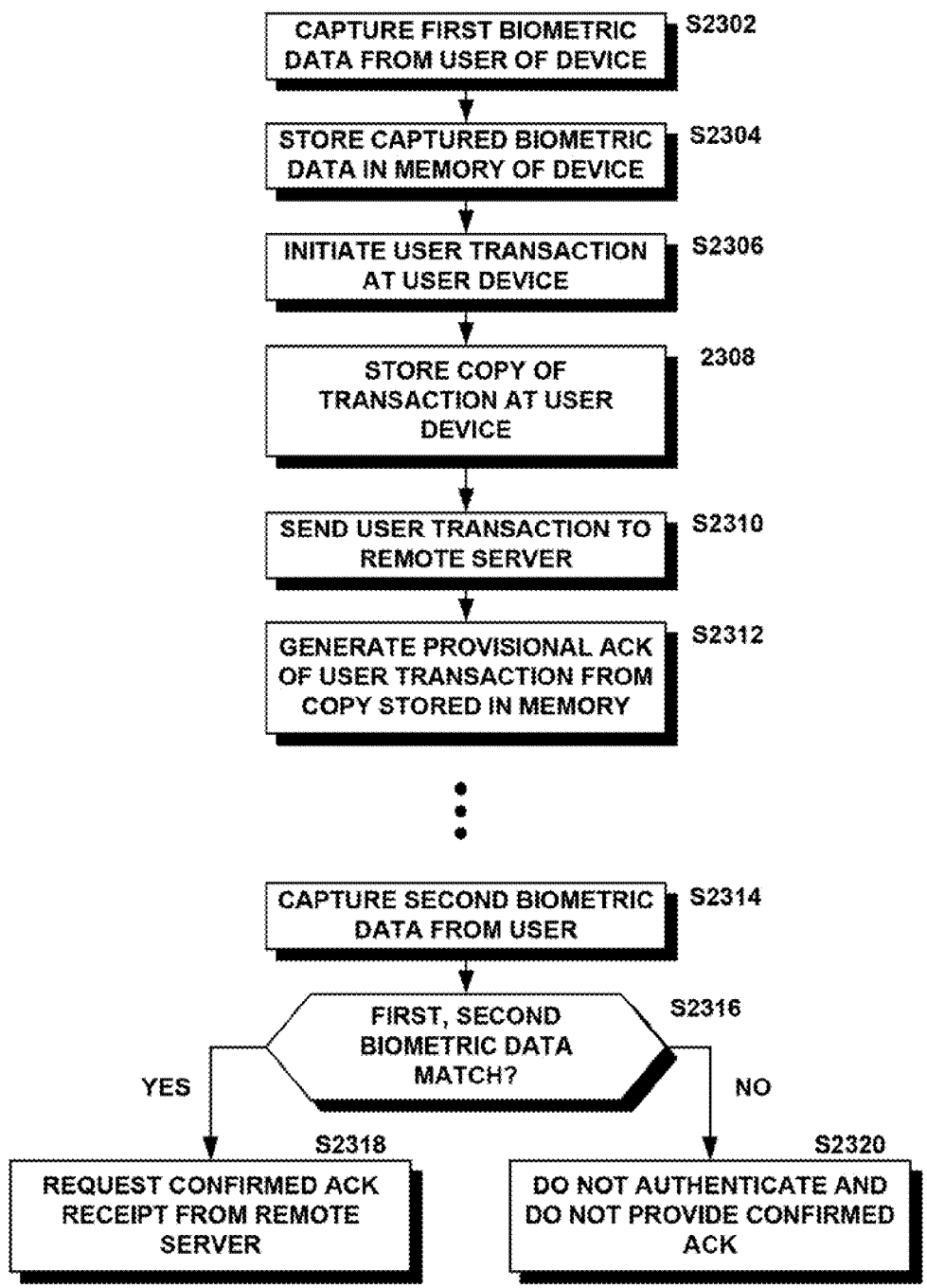
FIG. 23 is a flowchart showing a method according to another embodiment of the present invention.

Authentication using biometric data lends itself quite well to ecommerce applications in which a provisional acknowledgment is issued to the participant of the transaction, in advance of the issuance of a confirmed acknowledgment, as discussed above starting with the description of FIG. 10 and the following figures. Indeed, according to a further embodiment of the present thereof, the present invention is also a method of carrying out an online transaction between a device and a remote server over a network. As shown in FIG. 23, such a method may include a step 2302 of capturing first biometric data from the user of the device (using a biometric reader, such as shown at 2210 in FIG. 22). As shown at step 2304, the captured biometric data may then be stored in a memory of the device. Such memory may be or include nonvolatile memory, as shown at 302 in FIG. 22 or other storage, as shown at 204 and 206 in FIG. 2. As called for at step 2306, the user of the device (computer, handheld device, gaming machine or console, etc.) may then initiate a user transaction at the device (with an online vendor of goods or services, for example). A copy of the initiated transaction may then be stored at the user device, as shown at step 2308. After a copy thereof is stored in the device, the user transaction is sent to the remote server over a network (such as 2216 in FIG. 22), under the control of the user device, as outlined at step 2310. At this juncture, the transaction has been submitted to the remote server, but no confirmation of the transaction or the completion thereof has been received by the device from the remote server (such as remote server 2218 in FIG. 22).

Accordingly, an embodiment of the present inventions calls for a provisional acknowledgment of the user transaction to be generated from the copy of the user transaction stored in the memory, as shown at step 2312.

Either (or both) of the user device and the remote server 2218 now store a copy of the user's biometric data, a copy of the committed transaction and a copy of the provisional acknowledgment. This enables the user to leave the premises and to return some time later at the same or a different user device to request and be provided with a confirmed acknowledgment. This passage of time is suggested in FIG. 23 by the three dots between steps 2312 and 2314. When the user returns, he or she is asked to provide and the user device is configured to capture, the user's biometric information, as shown at 2314. This just-captured biometric information may then be matched against the previously provided biometric information, as shown at 2316. If the just provided biometric information matches the previously provided biometric information, a confirmed acknowledgment of the transaction identified by the provisional acknowledgment may be requested by the user device from the remote server, as shown at 2318. If the just provided biometric information does not match the previously provided biometric information, then no confirmed acknowledgment is either requested or provided, as shown at 2320. To enable the user device to identify the transaction, the provisional acknowledgment may be provided with human and/or machine readable indicia uniquely identifying the transaction. Moreover, the user device may be provided with functionality to read and interpret such human and/or machine readable indicia upon presentation of the provisional acknowledgment by the user to the device and to match such indicia against copies of user transactions stored in memory to identify the corresponding transaction.

When and if a confirmed acknowledgment is received from the remote server 2218, such confirmed acknowledgment may be stored in a memory of the user device and/or printed out or otherwise provided to the user. The user device may also be provided with the functionality to repeatedly re-send (indefinitely or for a predetermined number of times) the copy of the user transaction stored in the memory of the device to the remote server 2218 upon failure to timely receive the confirmed acknowledgment from the remote server.

Almost paradoxically, providing such biometric information may allow the user or player to remain anonymous, as the user or player need not be requested to provide his or her personal information or credentials. Indeed, while providing biometric information may, at first blush, appear to be intrusive, the provided biometric information, in fact, may be associated with an assigned or chosen unique but anonymous ID and may be associated with an anonymous payment instrument such as a gift card or an anonymous numbered account instead of a personally identifiable personal account.

It is not recommended, within the context of the present invention, to encapsulate the transaction model described within XML, because of the large overhead created by XML. Instead, the transactions and transaction model proposed herein may advantageously be used as a means to efficiently and securely process the transaction "payload" while the associated rich and "free" content may be handled according to traditional protocols, such as HTML, Java, XML, for example. It should be apparent that the transactional model and trusted transactional controller proposed herein may be initiated by a user from any client PC or client TTC connected to a home network.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A gaming machine configured to enable a player to play a game, comprising:
   a processor adapted to execute a program of the game;
   a biometric reader coupled to the processor, the biometric reader being configured to capture first biometric data from the player, and
   a cache, the cache being coupled to the processor and including:
      a nonvolatile memory, the nonvolatile memory being configured to store the first biometric data;
      a context data save engine configured to save the context of the program to the nonvolatile memory and to associate the stored first biometric data with the saved context of the program, upon the processor receiving a request from the player to suspend game play, and
      a context data recovery engine configured to recover the saved context from the nonvolatile memory and to cause continued execution of the program from the recovered saved context upon the biometric reader capturing second biometric data from the player that matches the stored first biometric data and receiving a request from the player to resume game play.

2. The gaming machine of claim 1, wherein the cache further comprises a watchdog timer, the watchdog timer being configured to timeout and generate an alert signal unless periodically reset.

3. The gaming machine of claim 2, further including a restart engine configured to initiate a controller restart cycle upon receiving the alert signal.

4. The gaming machine of claim 3, wherein the restart engine is configured to initiate a three phase controller restart cycle comprising a software reboot cycle, a hardware reset cycle and a power off cycle, the hardware reset cycle only being initiated upon failure of the software reboot cycle and the power off cycle only being initiated upon failure of the hardware reset cycle.

5. The gaming machine of claim 1, wherein the context data save engine is further configured to save the context of the program to the nonvolatile memory and to associate the stored first biometric data with the saved context of the program upon a power failure.

6. The gaming machine of claim 1, wherein the first and second biometric data includes at least one of fingerprint data, iris scan data, retina scan data, voice print data, facial feature data, hand geometry data and signature data.

7. The gaming machine of claim 1, wherein the first and second biometric data includes data associated with a measurable anatomical characteristic of the player.

8. The gaming machine of claim 1, wherein the first and second biometric data includes data associated with a measurable physiological characteristic of the player.

9. The gaming machine of claim 1, wherein the first and second biometric data includes data associated with a measurable behavioral characteristic of the player.

10. The gaming machine of claim 1, wherein the context data recovery engine is configured to enable resumption of the program as of a state thereof at which the player requested suspension of game play.

11. The gaming machine of claim 1, wherein the processor is further configured to cause meters of the player to be stored upon receipt of the request from the player to suspend game play.

12. The gaming machine of claim 11, further comprising a network interface, the network interface being configured to couple the gaming machine to a network, wherein the processor is further configured to send the player's meters over the network interface to be stored in a central server coupled to the network.

13. The gaming machine of claim 12, wherein the context data recovery engine is configured to cause the player's meters to be requested and received from the central server and to cause continued execution of the program from the recovered saved context and the received player's meters.

14. The gaming machine of claim 12, wherein the nonvolatile memory is further configured to store meters of the player and wherein the context data recovery engine is configured to cause the player's meters to be retrieved from the non-volatile memory and to cause continued execution of the program from the recovered saved context and the retrieved player's meters.

15. A gaming machine configured to enable a player to play a game, comprising:
a processor adapted to execute a program of the game;
a network interface, the network interface being configured to couple the gaming machine to a network;
a biometric reader coupled to the processor, the biometric reader being configured to capture first biometric data from the player and to cause the captured first biometric data to be sent over the network interface to a central server coupled to the network;
a context data save engine configured to save a context of the program and to send the player's meters and the saved context over the network interface to the central server and to associate the first biometric data with the saved context of the program, upon the processor receiving a request from the player to suspend game play, and
a context data recovery engine adapted to cause the first biometric data, the player's meters and the saved context to be requested and received from the central server over the network interface and to cause continued execution of the program from the received saved context using the received player's meters upon the biometric reader capturing second biometric data from the player that matches the received first biometric data and the processor receiving a request from the player to resume game play.

16. The gaming machine of claim 15, further comprising a watchdog timer, the watchdog timer being configured to timeout and generate an alert signal unless periodically reset.

17. The gaming machine of claim 16, further including a restart engine configured to initiate a controller restart cycle upon receiving the alert signal.

18. The gaming machine of claim 17, wherein the restart engine is configured to initiate a three phase controller restart cycle comprising a software reboot cycle, a hardware reset cycle and a power off cycle, the hardware reset cycle only being initiated upon failure of the software reboot cycle and the power off cycle only being initiated upon failure of the hardware reset cycle.

19. The gaming machine of claim 15, wherein the first and second biometric data includes at least one of fingerprint data, iris scan data, retina scan data, voice print data, facial feature data, hand geometry data and signature data.

20. The gaming machine of claim 15, wherein the first and second biometric data include data associated with a measurable anatomical characteristic of the player.

21. The gaming machine of claim 15, wherein the first and second biometric data include data associated with a measurable physiological characteristic of the player.

22. The gaming machine of claim 15, wherein the first and second biometric data include data associated with a measurable behavioral characteristic of the player.

23. The gaming machine of claim 15, wherein the context data recovery engine is configured to enable resumption of the program as of a state thereof at which the player requested suspension of game play.

24. The gaming machine of claim 15, wherein the context data save engine is further configured to save the context of the program and to associate the first biometric data with the saved context of the program, upon a power failure.

25. A method of securely executing a software program of a regulated gaming machine, comprising the steps of:
retrieving a timeout value and a first biometric data from an entry in a table;
setting a counter to the timeout value and starting the counter;
capturing second biometric data from a player of the gaming machine;
determining whether the first biometric data retrieved from the table matches the second biometric data captured from the player of the gaming machine, and
terminating an execution of the software program if the counter indicates that the timeout value has been exceeded or if the first biometric data retrieved from the table does not match the second biometric data captured from the player of the gaming machine.

26. The method of claim 25, further comprising the step of returning to the retrieving step to retrieve a timeout value from the table.

27. The method of claim 25, further comprising the step of allowing the software program to continue execution if the first biometric data matches the second biometric data and the timeout value has not been exceeded.

28. The method of claim 25, wherein the first biometric data and the second biometric data are encrypted and wherein the determining step includes a step of decrypting the first biometric data retrieved from the table and the second biometric data captured from the player of the gaming machine.

29. The method of claim 25, wherein the software program is divided into a plurality of execution sequences, each of the execution sequences being divided by a checkpoint at which the second biometric data is captured and wherein execution of each execution sequence is contingent upon a timely provision of the second biometric data at the preceding checkpoint.

30. Method of carrying out an online transaction between a device and a remote server over a network, comprising the steps of:
capturing first biometric data from the user of the device;
storing the captured biometric data in a memory of the device;
initiating a user transaction at the user device;
storing a copy of the user transaction in the memory of the device;
sending the user transaction to the remote server under a control of the device, and
generating a provisional acknowledgment of the user transaction from the copy of the user transaction stored in the memory;
capturing second biometric data from the user;

retrieving the first biometric data from the memory of the device and determining whether the second biometric data matches the retrieved first biometric data, and requesting a confirmed acknowledgment of the user transaction from the remote server if the second biometric data matches the first biometric data.

31. The method of claim 30, further comprising the step of:

receiving the confirmed acknowledgment from the remote server and storing the received confirmed acknowledgment in the memory of the device.

32. The method of claim 31, further including a step of providing the stored confirmed acknowledgment upon request from the user of the device.

33. The method of claim 30, further comprising the step of re-sending the copy of the user transaction stored in the memory of the device to the remote server upon failure to receive the confirmed acknowledgment from the remote server.

34. The method of claim 33, further comprising carrying out the re-sending step until a confirmed acknowledgment of the user transaction is received from the remote server.

35. The method of claim 33, wherein the re-sending step is carried out a predetermined number of times.

36. The method of claim 30, wherein the generating step includes a step of printing the provisional acknowledgment together with a corresponding machine-readable indicia that uniquely identifies the user transaction.

37. The method of claim 30, wherein the generating step includes a step of printing the provisional acknowledgment together with machine-readable indicia uniquely identifying the user transaction and wherein the method further includes a step of reading the machine-readable indicia and providing the stored confirmed acknowledgment that corresponds to the read machine-readable indicia.

38. The method of claim 37, wherein the stored confirmation acknowledgment providing step includes a step of printing the confirmation acknowledgment.

* * * * *